United States Patent
Toyoda et al.

(10) Patent No.: US 6,809,953 B2
(45) Date of Patent: Oct. 26, 2004

(54) POTENTIAL GENERATING CIRCUIT, POTENTIAL GENERATING DEVICE AND SEMICONDUCTOR DEVICE USING THE SAME, AND DRIVING METHOD THEREOF

(75) Inventors: Kenji Toyoda, Osaka (JP); Michihito Ueda, Takatsuki (JP); Kiyoshi Morimoto, Hirakata (JP); Kiyoyuki Morita, Yawata (JP); Toru Iwata, Osaka (JP); Jun Kajiwara, Yawata (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 0 days.

(21) Appl. No.: 10/440,277

(22) Filed: May 16, 2003

(65) Prior Publication Data

US 2003/0197548 A1 Oct. 23, 2003

Related U.S. Application Data

(63) Continuation of application No. PCT/JP02/13276, filed on Dec. 19, 2002.

(30) Foreign Application Priority Data

Dec. 20, 2001 (JP) .................................... 2001-387034

(51) Int. Cl.[7] .......................... G11C 11/22; G11C 11/24
(52) U.S. Cl. ...................................... 365/145; 365/149
(58) Field of Search ............................... 365/145, 149, 365/189.09, 226

(56) References Cited

U.S. PATENT DOCUMENTS

| | | | |
|---|---|---|---|
| 5,276,651 A | 1/1994 | Sakamoto | |
| 5,581,500 A | 12/1996 | O'Souza | |
| 5,821,769 A | 10/1998 | Douseki | |
| 5,854,561 A | 12/1998 | Arimoto et al. | |
| 6,066,943 A | 5/2000 | Hastings et al. | ............ 323/285 |
| 6,373,744 B1 * | 4/2002 | Mano | ......................... 365/145 |
| 6,498,743 B2 * | 12/2002 | Maruyama | .................. 365/145 |
| 6,512,686 B2 * | 1/2003 | Miyamoto | .................. 365/145 |

FOREIGN PATENT DOCUMENTS

| | | |
|---|---|---|
| JP | 64-076588 | 3/1989 |
| JP | 02-188161 | 7/1990 |
| JP | 05-250874 | 9/1993 |
| JP | 06-119773 | 4/1994 |
| JP | 08-017183 | 1/1996 |
| JP | 08-235858 | 9/1996 |
| JP | 09-121152 | 5/1997 |
| JP | 09-161480 | 6/1997 |

* cited by examiner

*Primary Examiner*—Trong Phan
(74) *Attorney, Agent, or Firm*—McDermott Will & Emery LLP

(57) ABSTRACT

A potential generating circuit comprises a capacitor (4); a ferroelectric capacitor (6) connected in series to the capacitor (4); an output terminal (11); a capacitor (10) for grounding the output terminal (11); a switch (9) for connecting a connecting node (5) between the two capacitors (4, 6) to the output terminal (11); and a switch (1) for connecting the connecting node (5) to the ground; wherein during a first period, with the switches (1) and (9) placed in the OFF state, a terminal (3) is provided with a positive potential and a terminal (7) is grounded; wherein during a second period following the first period, the terminal (3) is grounded and the switch (9) is placed in the ON state; wherein during a third period following the second period, the switch (9) is placed in the OFF state, the switch (1) is placed in the ON state, and the terminal (7) is provided with a positive potential; wherein during a fourth period following the third period, the terminal (7) is grounded; and wherein the first through fourth periods are repeated.

19 Claims, 13 Drawing Sheets

(a)

(b)

(a)

(b)

(a)

(b)

(a) φ'

(b) Vcp'

(c) Vbb'

Time

POTENTIAL GENERATING CIRCUIT, POTENTIAL GENERATING DEVICE AND SEMICONDUCTOR DEVICE USING THE SAME, AND DRIVING METHOD THEREOF

This application is a continuous of PCT/JP02/13276, filed Dec. 19, 2002.

BACKGROUND OF THE INVENTION

(1) Field of the Invention

The present invention relates to a semiconductor device, and in particular to a potential generating circuit, a potential generating device, and a semiconductor device using the same, and a driving method thereof, all of which can provide an electric potential different from a supply voltage.

(2) Description Of Related Art

In recent years, increasingly finer LSIs have been produced. According to a scaling law, a modern MOS transistor has an ultrathin oxide film as a gate insulating film and thus, a supply voltage must be kept low in order to reduce leak current and to maintain and improve reliability. According to a design rule which specifies a minimum gate length of 0.13 [µm], the oxide film thickness is 1.5 to 1.9 [nm] and the supply voltage is 1.2 to 1.5 [V]. On the other hand, a higher driving force must be provided for the MOS transistor to make a faster circuit and thus a threshold voltage must be reduced. However, a simply reduced threshold voltage may increase the leak current from the MOS transistor on standby.

To solve this problem, several methods of reducing off-leak current have been proposed, e.g., a method of causing the substrate of the MOS transistor on standby to have a negative potential and thus raising the threshold voltage of the MOS transistor. However, it is desirable that a single power supply should be used rather than a plurality of power supplies with different output voltages, since the latter may decrease the degree of circuit integration, lead to a cost increase, or reduce the efficiency. A typical prior art to solve this problem is a charge pump circuit which produces a negative voltage or a raised voltage from a supply voltage.

A substrate bias generating circuit using a prior charge pump circuit pumps up an electric charge out of an output terminal 67, for example, by causing N-channel MOS transistors 63 and 65 to periodically alternate between the ON state and the OFF state, respectively, as shown in FIG. 12. This allows the output terminal 67 to become a negative potential. FIGS. 13(a), 13(b), and 13(c) show how the potential φ' at an input terminal 61, the potential Vcp' at an intermediate node 64, and the potential Vbb' at the output terminal 67 vary with time, respectively.

With reference to FIG. 13, the operation of the prior substrate bias generating circuit will be described below. A pulse signal φ' with a voltage amplitude of supply potential (Vdd) is applied to the input terminal 61 as shown in FIG. 13(a). When the pulse signal φ' rises from the ground potential (0) to the supply potential (Vdd), the potential Vcp' at the intermediate node 64 rises from an initial value of −Vtn2, as shown in FIG. 13(b), via a charge pump capacitor 62. The value Vtn2 indicates the threshold voltage of the N-channel MOS transistor 65. The potential Vcp' at the intermediate node 64 rises from the initial value of −Vtn2 by the value Vdd. When the potential Vcp' at the intermediate node 64 rises to the potential (−Vtn2+Vdd), the N-channel MOS transistor 63 enters the ON state because of an increased gate voltage. This allows the charge pump capacitor 62 to slowly discharge electric charges accumulated in it, while the potential Vcp' at the intermediate node 64 falls to the threshold voltage Vtn1 of the N-channel transistor 63. When the pulse signal φ' falls from the supply potential to the ground potential, the potential Vcp' at the intermediate node 64 falls from an initial value of Vtn1 by the value Vdd. Then, the N-channel MOS transistor 65 enters the ON state, electric charges are accumulated in the charge pump capacitor 62, and the potential Vcp' at the intermediate node 64 rises from an initial value of (Vtn1−Vdd) to the value −Vtn2. In this way, while the N-channel MOS transistor 63 is in the ON state and the N-channel MOS transistor 65 is in the OFF state, electric charges accumulated in the charge pump capacitor 62 are discharged to a grounding terminal, and on the contrary, while the N-channel MOS transistor 63 is in the OFF state and the N-channel MOS transistor 65 is in the ON state, electric charges incoming from the output terminal 67 are accumulated in the charge pump capacitor 62. The above-described operations are repeated to allow the potential Vbb' at the output terminal 67 to slowly fall as shown in FIG. 13(c). The finally resultant voltage Vbb' is expressed by Equation 1 below:

$$Vbb'=-Vdd+(Vtn1+Vtn2) \qquad \text{(Equation 1)}$$

As described above, if a pulse signal is applied to the input terminal 61, a negative potential is provided by the charge pump circuit to the output terminal 67. However, as seen from Equation 1, there is a problem that the absolute value of an output voltage from the prior substrate bias generating circuit may decrease by the sum of the threshold voltages of the N-channel MOS transistors 63 and 65. Furthermore, it is also a problem that the power efficiency may be as low as approximately 30%.

BRIEF SUMMARY OF THE INVENTION

In order to solve the above-described problems, it is an object of the present invention to provide a potential generating circuit, a potential generating device, and a semiconductor device using the same, and a driving method thereof, all of which can produce no voltage drop in an output voltage.

A first potential generating circuit according to the present invention which can attain the above object comprises: a first capacitor; a second capacitor which is a ferroelectric capacitor connected in series to the first capacitor; an output terminal; a third capacitor for grounding the output terminal; a first switch for connecting a connecting node between the first capacitor and the second capacitor to the output terminal; and a second switch for connecting the connecting node to the ground; wherein during a first period, with the first switch and the second switch placed in the OFF state, a first terminal of the first capacitor opposed to the connecting node is provided with a positive potential and a second terminal of the second capacitor opposed to the connecting node is grounded; wherein during a second period following the first period, the first terminal is grounded and the first switch is placed in the ON state; wherein during a third period following the second period, the first switch is placed in the OFF state, the second switch is placed in the ON state, and the second terminal is provided with a positive potential; wherein during a fourth period following the third period, the second terminal is grounded; and wherein the first through fourth periods are repeated.

A first method of driving a potential generating circuit according to the present invention which can attain the above object comprises: in the above-described first potential generating circuit according to the present invention, a first period during which the first terminal is caused to have a positive potential, the second terminal is grounded, and the first switch and the second switch are placed in the OFF state; a second period following the first period, during which the first terminal is grounded and the first switch is placed in the ON state; a third period following the second period, during which the first switch is placed in the OFF state, the second switch is placed in the ON state, and the second terminal is caused to have a positive potential; and a fourth period following the third period, during which the second terminal is grounded; wherein the first through fourth periods are repeated.

A first potential generating device according to the present invention which can attain the above object comprises: the above-described first potential generating circuit according to the present invention; a control circuit for supplying to the potential generating circuit a driving signal for causing the first terminal to have a positive potential and grounding the second terminal, then grounding the first terminal and placing the first switch in the ON state, then placing the first switch and the second switch in the OFF and ON states, respectively, and causing the second terminal to have a positive potential, and then grounding the second terminal; and a potential detecting circuit for detecting an output potential at the output terminal; wherein the potential detecting circuit provides the control circuit with a control signal according to the detected output potential; and wherein the control circuit provides or stops providing the driving signal in response to the control signal.

A first method of driving a potential generating device according to the present invention which can attain the above object is a method of driving a potential generating device which comprises the above-described first potential generating circuit according to the present invention, a control circuit for supplying a driving signal to the potential generating circuit, and a potential detecting circuit for supplying a control signal to the control circuit, and comprises: a detecting step wherein the potential detecting circuit detects an output potential at the output terminal in the potential generating circuit; an enabling step wherein the potential detecting circuit provides the control circuit with an enabling signal so that the control circuit can provide the driving signal when the absolute value of the detected output potential is equal to or less than a first value, and the potential detecting circuit continues to provide the enabling signal until the absolute value is equal to or more than a second value; a disabling step wherein the potential detecting circuit provides the control circuit with a stop signal so that the control circuit can stop providing the driving signal when the absolute value is equal to or more than the second value, and the potential detecting circuit continues to provide the stop signal until the absolute value is equal to or less than the first value; a driving step wherein the control circuit provides the potential generating circuit with the driving signal upon receipt of the enabling signal; and a stopping step wherein the control circuit stops providing the potential generating circuit with the driving signal upon receipt of the stop signal.

A second potential generating device according to the present invention which can attain the above object comprises: the above-described first potential generating circuit according to the present invention; a control circuit for supplying to the potential generating circuit a driving signal for causing the first terminal to have a positive potential and grounding the second terminal, then grounding the first terminal and placing the first switch in the ON state, then placing the first switch and the second switch in the OFF and ON states, respectively, and causing the second terminal to have a positive potential, and then grounding the second terminal; and a potential detecting circuit for detecting an output potential at the output terminal; wherein the potential detecting circuit provides a predetermined signal when the absolute value of the detected output potential at the output terminal is equal to or less than a predetermined value; and wherein the control circuit provides a driving signal for supplying a positive potential to the first terminal, supplying a ground potential to the second terminal, and supplying such a potential that the first switch and the second switch are placed in the OFF state, when the control circuit receives the predetermined signal while providing the driving signal for supplying a ground potential to the first terminal and the second terminal and supplying such potentials that the first switch is placed in the OFF state and the second switch is placed in the ON state.

A third potential generating device according to the present invention which can attain the above object comprises: the above-described first potential generating circuit according to the present invention; a second potential generating circuit configured to comprise a fourth capacitor, a fifth capacitor which is a ferroelectric capacitor connected in series to the fourth capacitor, a sixth capacitor for grounding the output terminal, a third switch for connecting a second connecting node between the fourth capacitor and the fifth capacitor to the output terminal, and a fourth switch for connecting the second connecting node to the ground; a first control circuit for supplying to the first potential generating circuit according to the present invention a first driving signal for causing the first terminal to have a positive potential and grounding the second terminal, then grounding the first terminal and placing the first switch in the ON state, then placing the first switch and the second switch in the OFF and ON states, respectively, and causing the second terminal to have a positive potential, and then grounding the second terminal; a second control circuit for supplying to the second potential generating circuit a second driving signal for causing the third terminal of the fourth capacitor opposed to the second connecting node to have a positive potential and grounding the fourth terminal of the fifth capacitor opposed to the second connecting node, then grounding the third terminal and placing the third switch in the ON state, then placing the third switch and the fourth switch in the OFF and ON states, respectively, and causing the fourth terminal to have a positive potential, and then grounding the fourth terminal; and a potential detecting circuit for detecting an output potential at the output terminal; wherein an output timing of the first driving signal is shifted from an output timing of the second driving signal by a half cycle; wherein the potential detecting circuit provides the first control circuit and the second control circuit with a control signal according to the detected output potential; wherein the first control circuit provides or stops providing the first driving signal in response to the control signal; and wherein the second control circuit provides or stops providing the second driving signal in response to the control signal.

A second method of driving a potential generating device according to the present invention which can attain the above object is a method of driving the above-described third potential generating device according to the present invention, and comprises: a detecting step wherein the potential detecting circuit detects an output potential at the output terminal; an enabling step wherein the potential detecting circuit provides the first control circuit and the second control circuit with an enabling signal so that the control circuits can provide the first driving signal and the second driving signal when the absolute value of the detected output potential is equal to or less than a first value, and the potential detecting circuit continues to provide the enabling signal until the absolute value is equal to or more than a second value; a disabling step wherein the potential detecting circuit provides the first control circuit and the second control circuit with a stop signal so that the control circuits can stop providing the first driving signal and the second driving signal when the absolute value is equal to or more than the second value, and the potential detecting circuit continues to provide the stop signal until the absolute value is equal to or less than the first value; a first driving step wherein the first control circuit provides the first potential generating circuit according to the present invention with the first driving signal upon receipt of the enabling signal; a first stopping step wherein the first control circuit stops providing the first potential generating circuit according to the present invention with the first driving signal upon receipt of the stop signal; a second driving step wherein the second control circuit provides the second potential generating circuit according to the present invention with the second driving signal, at a timing shifted by a half cycle from the output timing of the first driving signal, upon receipt of the enabling signal; and a second stopping step wherein the second control circuit stops providing the second potential generating circuit with the second driving signal upon receipt of the stop signal.

A first semiconductor device according to the present invention which can attain the above object comprises: a memory cell; a fifth switch; and the above-described first potential generating device according to the present invention which is connected to a word line of the memory cell via the fifth switch; wherein the fifth switch is placed in the ON state while the memory cell is on standby.

A second semiconductor device according to the present invention which can attain the above object comprises: the above-described first potential generating device according to the present invention; a N-channel field-effect transistor; and a sixth switch for connecting the output terminal of the potential generating device to the substrate of the N-channel field-effect transistor; wherein the sixth switch is placed in the ON state while the N-channel field-effect transistor is on standby.

A third semiconductor device according to the present invention which can attain the above object comprises: the above-described first potential generating device according to the present invention; a logic circuit composed of field-effect transistors; a high-threshold P-channel field-effect transistor connecting the logic circuit to a predetermined potential and having a threshold voltage larger than those of the field-effect transistors; and a seventh switch for connecting the gate of the high-threshold P-channel field-effect transistor to the potential generating device; wherein the seventh switch is placed in the ON state while the logic circuit is in operation and in the OFF state while the logic circuit is on standby.

A fourth semiconductor device according to the present invention which can attain the above object comprises: the above-described first potential generating device according to the present invention; a logic circuit composed of field-effect transistors; a high-threshold N-channel field-effect transistor connecting the logic circuit to a predetermined potential and having a threshold voltage larger than those of the field-effect transistors; and an eighth switch for connecting the gate of the high-threshold N-channel field-effect transistor to the potential generating device; wherein the eighth switch is placed in the ON state while the logic circuit is on standby and in the OFF state while the logic circuit is in operation.

A first method of driving a semiconductor device according to the present invention which can attain the above object is a method of driving the above-described third semiconductor device according to the present invention, and comprises: an operating step wherein while the logic circuit is in operation, the seventh switch is placed in the ON state and a negative potential is supplied by the potential generating device to the gate of the high-threshold P-channel field-effect transistor; and a standby step wherein while the logic circuit is on standby, the seventh switch is placed in the OFF state and a positive potential is supplied to the gate of the high-threshold P-channel field-effect transistor.

A second method of driving a semiconductor device according to the present invention which can attain the above object is a method of driving the above-described fourth semiconductor device according to the present invention, and comprises: a standby step wherein while the logic circuit is on standby, the eighth switch is placed in the ON state and a negative potential is supplied by the potential generating device to the gate of the high-threshold N-channel field-effect transistor; and an operating step wherein while the logic circuit is in operation, the eighth switch is placed in the OFF state and a positive potential is supplied to the gate of the high-threshold N-channel field-effect transistor.

DETAILED DESCRIPTION OF THE INVENTION

Embodiments of a potential generating circuit, potential generating devices, and semiconductor devices using the same, and driving methods thereof according to the present invention will be described below with reference to the accompanying drawings.

First Embodiment

Figure 1:
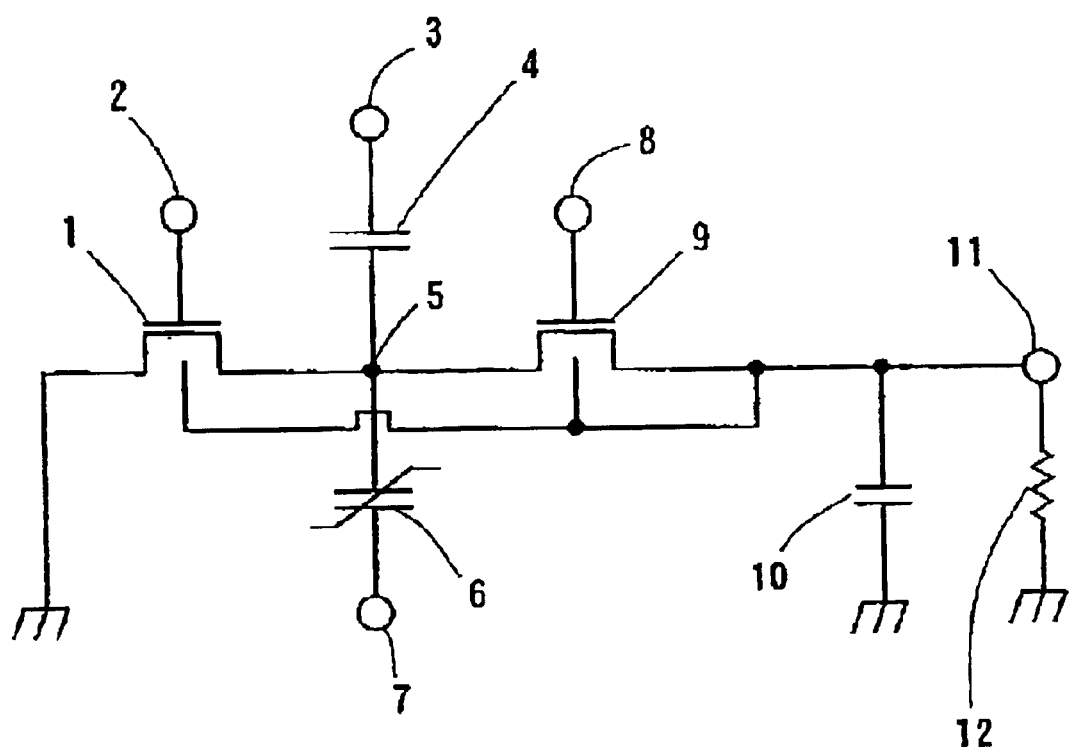
FIG. 1 is a circuit diagram for showing a potential generating circuit according to a first embodiment of the present invention.

FIG. 1 is a circuit diagram for showing a potential generating circuit according to a first embodiment of the present invention. The potential generating circuit according to this embodiment comprises a N-channel MOS transistor 1 as a second switch, a reset control terminal 2, a ferroelectric write terminal 3, a paraelectric capacitor 4 as a first capacitor, a ferroelectric capacitor 6 as a second capacitor, a ferroelectric reset terminal 7, an output control terminal 8, a N-channel MOS transistor 9 as a first switch, a load capacitor 10, and an output terminal 11. The paraelectric capacitor 4 and the ferroelectric capacitor 6 are connected in series with each other to form a connecting node 5. In order to prevent the pn junction formed between the source-drain region and the substrate in each MOS transistor from being forward-biased, the substrates of the N-channel MOS transistors 1 and 9 are connected to the output terminal 11 so that they may have a negative potential. In FIG. 1, a target that is supplied with voltage is expressed as a load resistor 12. The term "terminal" used herein is not limited to a connector, a contact pin, or any other electric circuit parts and also means any end, to which electric connection can be made, in each electric circuit element.

For example, the ferroelectric capacitor 6 made of strontium bismuth tantalate ($SrBi_2Ta_2O_9$; SBT) with an area of 100 [$\mu m^2$] and the paraelectric capacitor 4 with a capacitance value of 3.2 [pF] are used for this embodiment. The load capacitor 10 has a capacitance value of 20 [pF] and the load resistor 12 has a resistance value of 500 [kΩ]. The operation of the potential generating circuit as configured above will be described below. Electric characteristics of the ferroelectric capacitor 6 will be described later in detail and is not further described here. Initially, the resent control terminal 2, the ferroelectric write terminal 3, the ferroelectric reset terminal 7, and the output control terminal 8 have a potential of 0 [V], respectively, and the N-channel MOS transistors 1 and 9 are in the OFF state.

First of all, during a first period, a positive pulsed voltage Vwp of 5 [V] is applied to the ferroelectric write terminal 3 in the above-described initial state. This first period which acts to reverse the polarization of the ferroelectric capacitor 6 is referred to as a ferroelectric write period. Next, during a second period, the voltage Vwp of the ferroelectric write terminal 3 is reduced to the same voltage as that of the ferroelectric reset terminal 7, i.e., 0 [V]. This can produce a negative potential at the connecting node 5. Then, a potential Vcp held at the connecting node 5 is provided to the output terminal 11 by applying a supply voltage Vdd as a voltage Vog of the output control terminal 8 to place the N-channel MOS transistor 9 in the ON state. This second period, during which a potential is provided by reversing the polarization of the ferroelectric capacitor 6, is referred to as a ferroelectric read period. In addition, during the ferroelectric read period, the absolute value of the output potential is decreased slowly, since a load current flowing from the output terminal 11 into the connecting node 5 may accumulate electric charges at the connecting node 5 or make the polarization of the ferroelectric capacitor 6 unstable. To avoid such a decreased output, during a third period, the polarization of the ferroelectric capacitor 6 is reversed in the opposite direction to draw out the electric charges accumulated at the connecting node 5. More specifically, the polarization of the ferroelectric capacitor 6 is reversed in the opposite direction to that in the ferroelectric write period by reducing the voltage of the output control terminal 8 to 0 [V] to place the N-channel MOS transistor 9 in the OFF state, applying the supply voltage Vdd to the reset control terminal 2 to place the N-channel transistor 1 in the ON state and to cause the connecting node 5 to have a ground potential, and applying a positive pulsed voltage Vrp to the ferroelectric reset terminal 7. This can reset the polarization state of the ferroelectric capacitor 6. The third period is referred to as a ferroelectric reverse period. Lastly, during a fourth period, with the N-channel MOS transistor 1 in the ON state, i.e., with the connecting node 5 remained at a ground potential, the ferroelectric reset terminal 7 is caused to have a ground potential, i.e., reduced to 0 [V]. This can draw out positive electric charges accumulated at the connecting node 5. The fourth period is referred to as a charge draw-out period.

Figure 2:
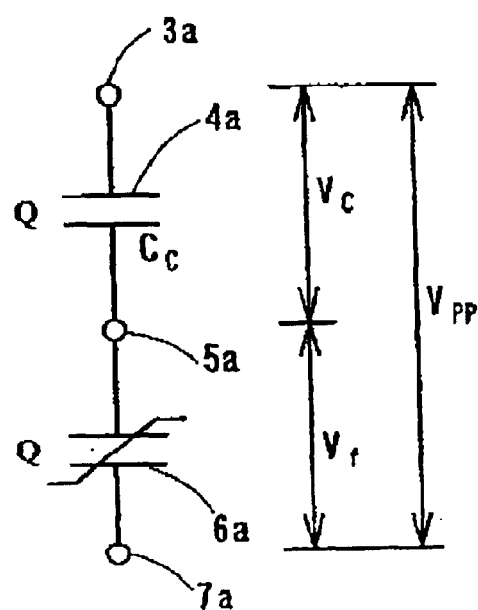
FIG. 2 is an explanatory drawing for the operation of the potential generating circuit according to the first embodiment of the present invention.
Figure 2:
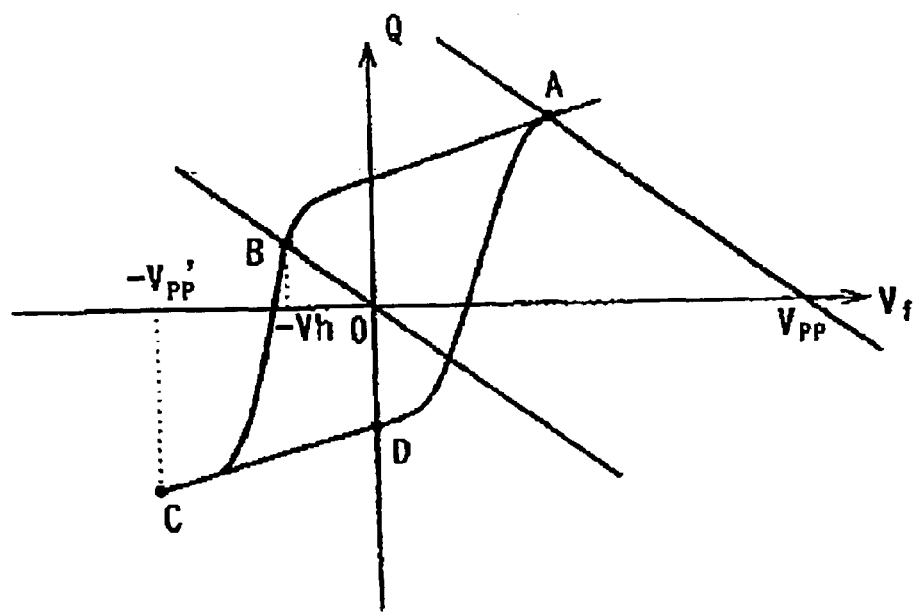

The operation of the serially-connected circuit consisting of the ferroelectric capacitor 6 and the paraelectric capacitor 4 has not been described above and now will be described below with reference to FIG. 2. FIG. 2(a) is a circuit diagram for showing that a ferroelectric capacitor 6a and a paraelectric capacitor 4a with a capacitance value Cc are connected in series. When a terminal 7a of the ferroelectric capacitor 6a is grounded and a voltage Vpp is applied to a terminal 3a of the paraelectric capacitor 4a, voltages applied to the ferroelectric capacitor 6a and the paraelectric capacitor 4a are supposed to be Vf and Vc, respectively. Then, the relationship of these voltages can be expressed by the following equation:

$$Vpp = Vf + Vc \quad \text{(Equation 2)}$$

Supposing that a charge quantity Q is induced by the polarization phenomenon of the ferroelectric capacitor 6a, the charge quantity Q is also induced in the upper electrode of the paraelectric capacitor 4a so that the total charge at the connecting node 5a between the ferroelectric capacitor 6a and the paraelectric capacitor 4a is 0 according to the charge conservation law. This can be expressed by the following equation:

$$Q = Cc \cdot Vc \quad \text{(Equation 3)}$$

Applying Equation 2 to Equation 3 yields the following:

$$Q = Cc \cdot (Vpp - Vf) \quad \text{(Equation 4)}$$

On the other hand, the relationship between the charge quantity Q of the ferroelectric capacitor 6a and the voltage Vf exhibits hysteresis characteristics as shown in FIG. 2(b). In FIG. 2(b), the relationship of Equation 4 is expressed as oblique lines overlaid on the hysteresis curve. Therefore, intersection points of the hysteresis curves and the oblique lines in FIG. 2(b) indicate the state in which the hysteresis characteristics and the relationship of Equation 4 are satisfied simultaneously, i.e., the points indicate the voltage Vf applied to the ferroelectric capacitor 6a and the charge quantity Q as shown in FIG. 2(a).

Point A in FIG. 2(b) indicates the charge quantity Q and the voltage Vf of the ferroelectric capacitor 6a when the terminal 7a of the ferroelectric capacitor 6a is grounded and a large positive voltage (Vpp) is constantly applied to the terminal 3a of the paraelectric capacitor 4a. The state at Point A corresponds to the above-described ferroelectric write period. Point B indicates the charge quantity Q and the voltage Vf of the ferroelectric capacitor 6a when the terminal 7a of the ferroelectric capacitor 6a remains grounded and the voltage of the terminal 3a of the paraelectric capacitor 4a returns to 0 [V] after the large positive voltage (Vpp) is applied to the terminal 3a of the paraelectric capacitor 4a. The state of Point B corresponds to the above-described ferroelectric read period. In this state, a negative voltage −Vh is applied to the ends 5a and 6a of the ferroelectric capacitor 6a (see FIG. 2(b)). More specifically, since the terminal 7a of the ferroelectric capacitor 6a is grounded, the connecting node 5a between the ferroelectric capacitor 6a and the paraelectric capacitor 4a is held at a negative potential −Vh. Therefore, as described above, when the N-channel MOS transistor 9 is turned ON during the ferroelectric read period in the circuit diagram as shown in FIG. 1, the negative potential −Vh produced at the connecting node 5 is provided to the output terminal 11. Point C indicates the charge quantity Q and the voltage Vf of the ferroelectric capacitor 6a when the connecting node 5a is at the ground potential and a large negative voltage (−Vpp') is constantly applied to the terminal 7a of the ferroelectric capacitor 6a. The absolute value of the negative voltage (−Vpp') applied to the terminal 7a may be smaller than that of the positive voltage (Vpp) applied to the terminal 3a. The state of Point C corresponds to the above-described ferroelectric reverse period. Then, since an electric field in the opposite direction to that in the state at Point A (corresponding to the ferroelectric write period) is produced at the ferroelectric capacitor 6a and the polarization of the ferroelectric capacitor 6a is reversed in the opposite direction to that of the ferroelectric write period, the polarization state of the ferroelectric capacitor 6a can be reset. Point D indicates the charge quantity Q and the voltage Vf of the ferroelectric capacitor 6a when the connecting node 5a is at the ground potential and the terminal 7a of the ferroelectric capacitor 6a returns to a voltage of 0 [V] after a large negative voltage (−Vpp') is applied to the terminal 7a of the ferroelectric capacitor 6a. The state of Point D corresponds to the above-described charge draw-out period. Therefore, as described above, when the N-channel MOS transistor 1 is held in the ON state after the ferroelectric reset terminal 7 is caused to have the ground potential in the circuit diagram shown in FIG. 1, the ends of the ferroelectric capacitor 6 are short-circuited to allow all electric charges accumulated at the connecting node 5 to flow out.

Figure 3:
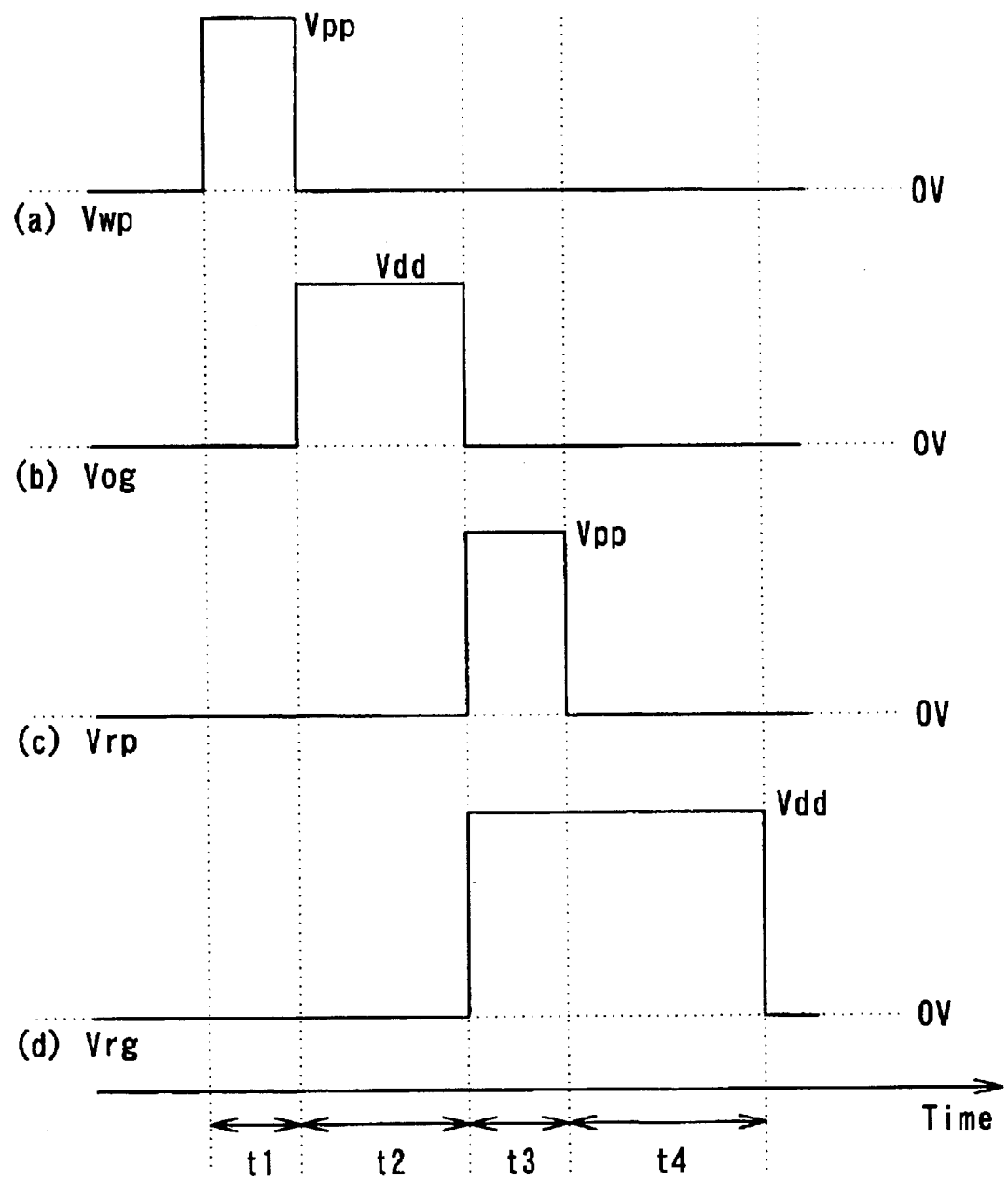
FIG. 3 shows how the voltage applied to each terminal of the potential generating circuit according to the first embodiment of the present invention varies with time.

Voltages applied to the terminals in the potential generating circuit according to the present invention and the timings thereof will be further described below with reference to FIG. 3. In FIG. 3, Vwp, Vog, Vrp, and Vrg indicate potentials at the ferroelectric write terminal 3, the output control terminal 8, the ferroelectric reset terminal 7, and the reset control terminal 2, respectively.

(1) During the ferroelectric write period t1, a voltage Vpp is applied only to the ferroelectric write terminal 3. For example, when a voltage Vpp of 5 [V] was applied for approximately 20 [ns], a potential of approximately 1.8 [V] was produced at the connecting node 5. However, since the output control terminal 8 is 0[V] and the N-channel MOS transistor 9 is in the OFF state during this period, no potential is provided to the output terminal 11.

(2) During the ferroelectric read period t2, a voltage Vdd is applied only to the output control terminal 8. As described above, the connecting node 5 is held at a negative potential during this period. For example, when a voltage Vdd of 5 [V] was applied for approximately 200 [ns], a potential Vcp of approximately −0.94 [V] was produced at the connecting node 5. According to this embodiment, since during this period, the supply voltage of 5 [V] is applied to the gate of the N-channel MOS transistor 9 which is the output control terminal 8, the output voltage at the output terminal 11 does not decrease by the threshold voltage.

(3) During the ferroelectric reverse period t3, a voltage Vpp is applied to the ferroelectric reset terminal 7 and a voltage Vdd is applied to the reset control terminal 2. During this period, the polarization of the ferroelectric capacitor 6 is reversed in the opposite direction to that of the ferroelectric write period t1.

(4) During the charge draw-out period t4, the voltage Vdd remains applied to the reset control terminal 2 continuously since the ferroelectric reverse period t3, and the voltage at the ferroelectric reset terminal 7 is returned to 0 [V]. Since during this period, as described above, the ends of the ferroelectric capacitor 6 are short-circuited by the N-channel MOS transistor 1, electric charges accumulated at the connecting node 5 are drawn out.

Supposing that the above-described periods t1 to t4 form a cycle, the above-described operations (1) to (4) are repeated to allow the output terminal 11 to continuously supply a negative potential.

Figure 4:
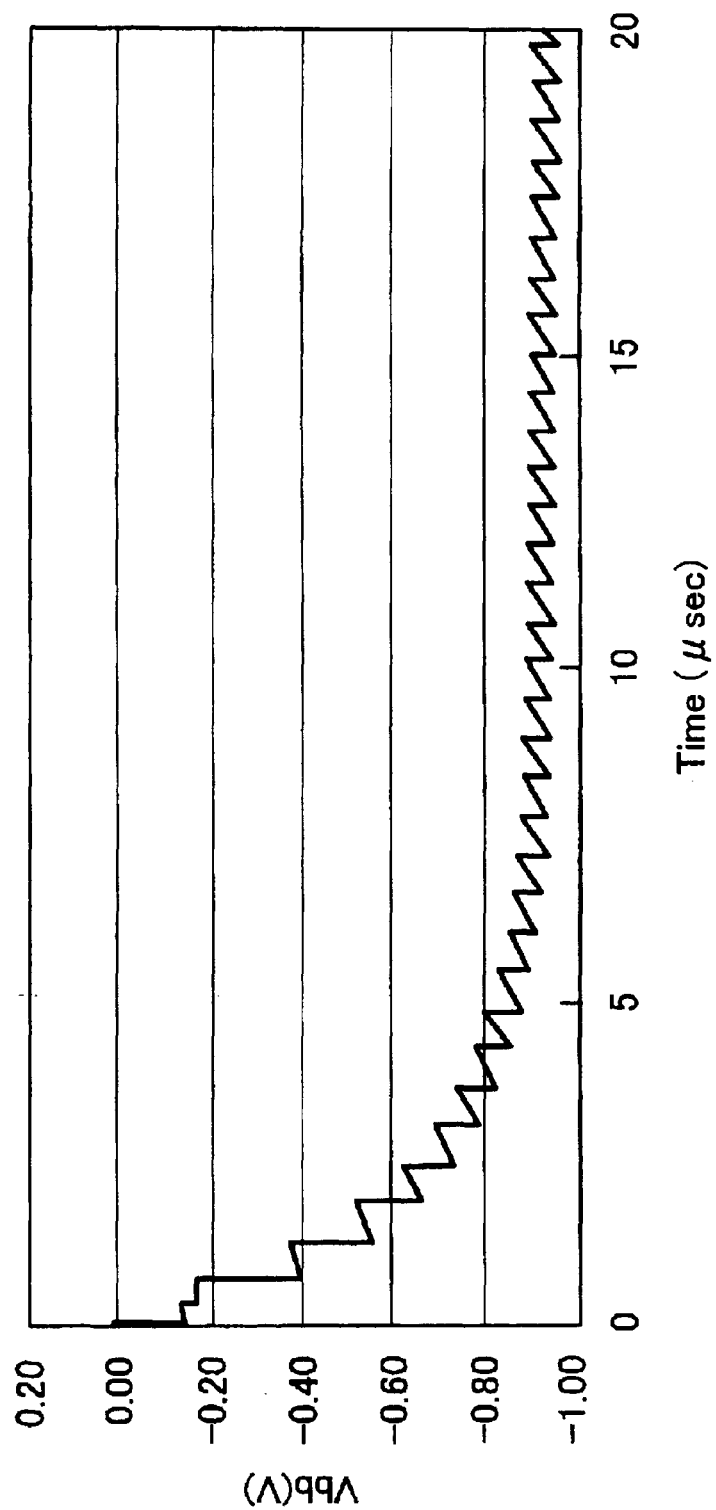
FIG. 4 shows how the voltage applied to the output terminal of the potential generating circuit according to the first embodiment of the present invention varies with time.

FIG. 4 shows how the potential Vbb at the output terminal 11 varies with time in the case where the voltage at each terminal of the potential generating circuit according to this embodiment is controlled with timings as shown in FIG. 3. For this purpose, a voltage Vpp of 5 [V] was applied during the ferroelectric write period t1 of approximately 20 [ns], a voltage Vdd of 5 [V] was applied during the ferroelectric read period t2 of approximately 200 [ns], voltages Vpp and Vdd of 5 [V] were applied during the ferroelectric reverse period t3 of approximately 20 [ns], and a voltage Vdd of 5 [V] was applied during the charge draw-out period t4 of approximately 180 [ns]. As seen from FIG. 4, the potential Vbb at the output terminal 11 became sufficiently stable after a lapse of approximately 10 [μs] with a value of approximately −0.92 [V]. The load current had a value of approximately 1.9 [μA] at the point of time.

FIGS. 5(a) and 5(b) show how the potential Vbb at the output terminal 11 and the potential Vcp at the connecting node 5 vary with time, respectively, in the state after the output from the potential generating circuit according to this embodiment has become stable under the same conditions as those for FIG. 4. As shown in FIG. 5(a), the potential Vbb at the output terminal 11 decreases to approximately −0.89 [V] during the above-described ferroelectric write period t1 because the output terminal 11 is disconnected from the connecting node 5. However, the output potential Vbb recovers to approximately −0.95 [V] during the ferroelectric read period t2 because a potential is supplied to the output terminal 11 through the connecting node 5. During the ferroelectric reverse period t3 through the charge draw-out period t4, the potential Vbb monotonously increases from approximately −0.95 [V] to approximately −0.90 [V] As shown in FIG. 5(b), the potential Vcp at the connecting node 5 is approximately 1.8 [V] during the ferroelectric write period t1 because a positive pulsed voltage is applied to the ferroelectric write terminal 3. During the ferroelectric read period t2, the potential Vcp is held at a negative value of approximately −0.94 [V]. During the ferroelectric reverse period t3, the potential Vcp increases up to approximately 1.4 [V] because the polarization of the ferroelectric capacitor 6 is reversed in the opposite direction. During the charge draw-out period t4, the potential Vcp has a value of 0 [V] because the ends of the ferroelectric capacitor 6 are short-circuited. More specifically, the potential Vbb at the output terminal 11 exhibits a ripple voltage of approximately 0.06 [V] and an average per cycle of approximately −0.92 [V].

As described above, the potential generating circuit according to the first embodiment can produce a negative potential at the connecting node 5 between the ferroelectric capacitor 6 and the paraelectric capacitor 4 due to an reverse polarization of the ferroelectric capacitor 6. In addition, the output voltage does not decrease by the threshold voltage of the N-channel MOS transistors 1 and 9 because the supply voltage is applied to the gates of the N-channel MOS transistors 1 and 9 to place them in the ON state. Although a prior substrate bias generating circuit uses a paraelectric capacitor and needs a continuous application of pulsed voltage to the paraelectric capacitor, the potential generating circuit according to this embodiment uses a residual polarization of the ferroelectric capacitor to produce potentials and does not need a continuous application of pulsed voltage to the ferroelectric capacitor, thereby its power efficiency is better than that of the prior substrate bias generating circuit.

For the embodiment described above, the ferroelectric capacitor is made of STB but the material is not limited to STB, and it is needless to say that lead zirconate titanate ($Pb(Zr_{0.45}Ti_{0.55})O_3$; PZT) or any other material, which has hysteresis characteristics for the relationship between applied voltages and accumulated charges, may provide similar operating characteristics to those of the potential generating circuit according to this embodiment. For example, a polymer compound such as poly vinylidene fluoride-trifluoroethylene copolymer (P(VDF/TrFE)) may provide similar operating characteristics.

Figure 5:
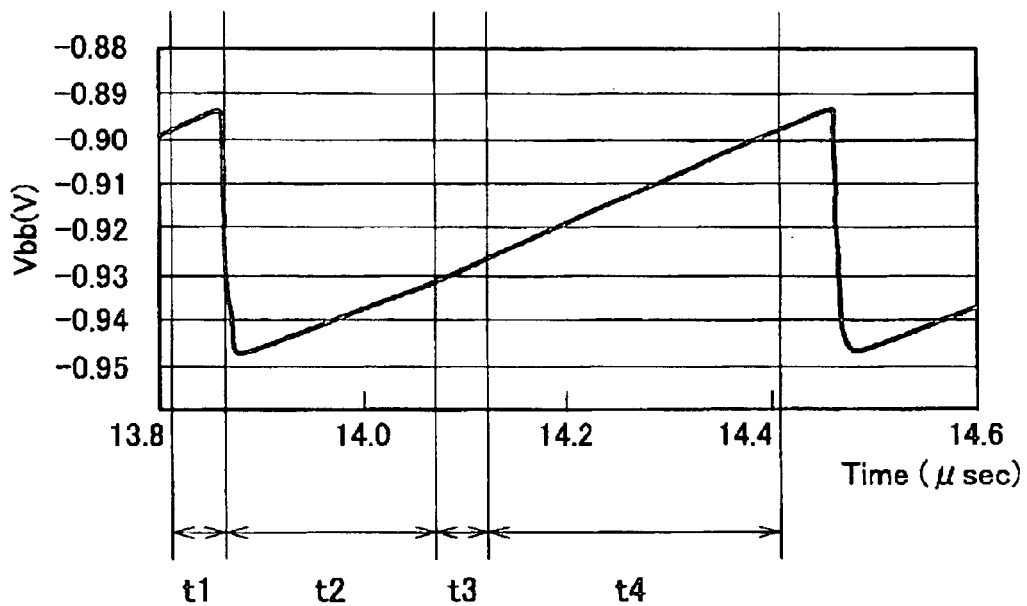
FIGS. 5(a) and 5(b) show how the output voltage and the intermediate node voltage in the potential generating circuit according to the first embodiment of the present invention vary with time, respectively.
Figure 5:
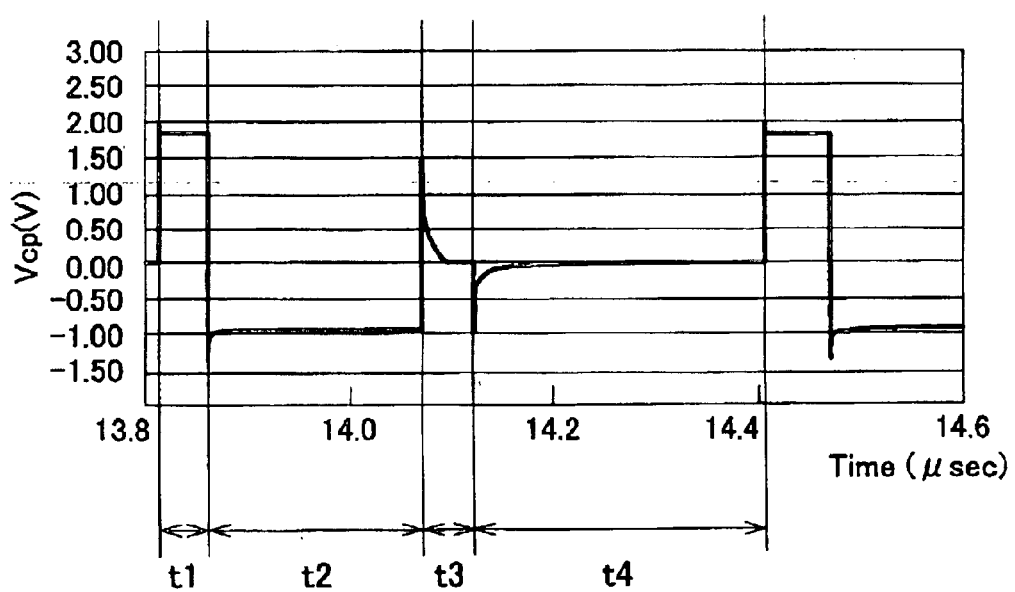

The amount of time required for reaching the stable potential and the size of ripple shown in FIGS. 4 and 5 vary with values of the load resistor 12 and the load capacitor 10. Therefore, it is desirable to design and adjust circuit constants for the parts in the potential generating circuit including the load capacitor 10 so that desired output characteristics can be obtained according to the electric characteristics of a target that is supplied a potential.

Second Embodiment

Figure 6:
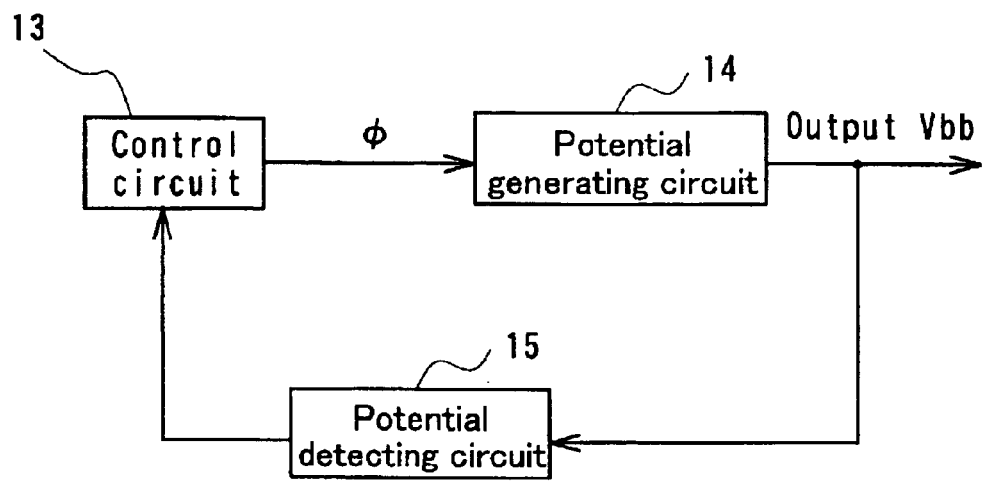
FIG. 6(a) is a block diagram for schematically showing the configuration of a potential generating device according to a second embodiment of the present invention.
FIG. 6(b) is an explanatory drawing for the relationship between the output potential of the potential generating device and the operation of its control circuit.
Figure 6:
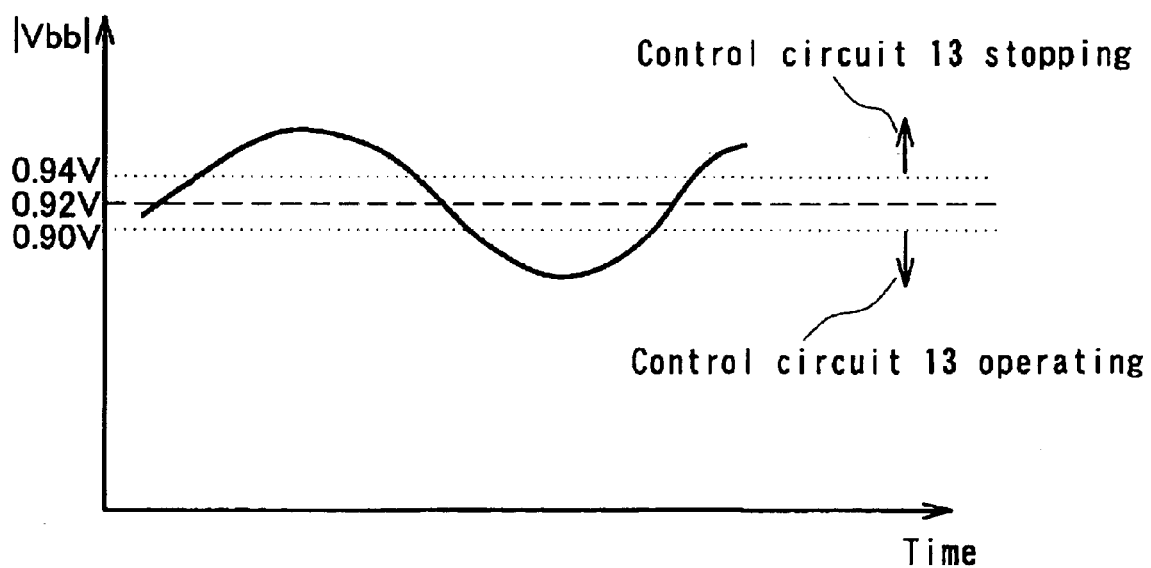

FIG. 6(a) is a block diagram for schematically showing the configuration of a potential generating device according to a second embodiment of the present invention. As shown in FIG. 6(a), the potential generating device according to this embodiment is configured to comprise a potential generating circuit 14 according to the first embodiment, a control circuit 13 for controlling the potential generating circuit 14, and a detecting circuit 15 for detecting an output potential from the potential generating circuit 14.

In this embodiment, the control circuit 13 is a circuit which uses the driving method as shown in FIG. 3 for the first embodiment to operate the potential generating circuit 14. More specifically, in operation, the control circuit 13 supplies predetermined voltages to the terminals 2, 3, 7 and 8 (see FIG. 1) of the potential generating circuit 14 with the timings as shown in FIG. 3. A symbol φ in FIG. 6 indicates the voltages Vrg, Vwp, Vrp, and Vog supplied to the terminals 2, 3, 7 and 8 of the potential generating circuit 14. The control circuit 13 changes its operating state in response to a signal supplied by the potential detecting circuit 15.

First, the situation in which the control circuit 13 operates or stops in response to a signal supplied by the potential detecting circuit 15 will be described below. Suppose that the relationship between a first predetermined value V1 and a second predetermined value V2 is expressed as 0<V1<V2.

The potential detecting circuit 15 detects the absolute value |Vbb| of a potential provided by the potential generating circuit 14, provides a signal for operating the control circuit 13 when |Vbb| is equal to or less than V1, remains in the same state until |Vbb| is equal to or more than V2, provides a signal for stopping the control circuit 13 when |Vbb| is equal to or more than V2, and remains in the same state until |Vbb| is equal to or less than V1.

Specifically, as shown in FIG. 6(b), supposing that the first predetermined value V1 is equal to 0.90 [V] and the second predetermined value V2 is equal to 0.94 [V], the potential detecting circuit 15 provides a signal for stopping the control circuit 13 when the absolute value |Vbb| of a potential provided by the potential generating circuit 14 increases from a value within a range of 0.90 to 0.94 [V] to a value equal to or more than 0.94 [V] while the control circuit 13 is in operation. Thereafter, the potential detecting circuit 15 remains in the same state, i.e., continues to provide the signal for stopping the control circuit 13 until |Vbb| decreases to a value equal to or less than 0.90 [V], and then provides a signal for operating the control circuit 13 when |Vbb| is equal to or less than 0.90 [V]. Then, the potential detecting circuit 15 remains in the same state, i.e., continues to provide the signal for operating the control circuit 13 until |Vbb| increases to a value equal to or more than 0.94 [V], and then provides a signal for stopping the control circuit 13 when |Vbb| is equal to or more than 0.94 [V].

For this embodiment, there is provided a difference of 0.4 [V] between the two operating threshold voltages V1, V2 in order to keep the stable operation of the potential generating device, but this value imposes no restrictions on the concept of the present invention. Namely, any value other than 0.4 [V] may be used or only one threshold value may be used. For example, the potential detecting circuit 15 may detect the absolute value |Vbb| of a potential provided by the potential generating circuit 14, provide a signal for operating the control circuit 13 when it is equal to or less than a predetermined threshold V3, and provide a signal for stopping the control circuit 13 when it exceeds the threshold V3.

Next, the situation in which the control circuit 13 changes the timing of supplying a voltage to the potential generating circuit 14 in response to a signal applied by the potential detecting circuit 15 will be described below. In this situation, the absolute value |Vbb| of a voltage Vbb at the output terminal 11 is observed and the timing of the control circuit 13 supplying a voltage to the potential generating circuit 14 is adjusted so that the difference between minimum and maximum values (ripple) may be minimized, since the absolute value |Vbb| decreases to a minimum at the last moment within the ferroelectric write period t1 and increases to a maximum immediately after the succeeding the potential detecting circuit 15 detects the absolute value |Vbb| of a potential provided by the potential generating circuit 14 and provides a signal for causing the control circuit 13 to terminate the charge draw-out period t4 and to begin the ferroelectric write period t1 when |Vbb| is equal to or less than a predetermined value V4.

Specifically describing with reference to FIG. 5, for example, since the value Vbb is approximately −0.90 [V] at the point of time when the ferroelectric write period t1 begins and approximately −0.89 [V] immediately before the period t1 terminates, the potential detecting circuit 15 detects the absolute value |Vbb| of a potential provided by the potential generating circuit 14 and provides a signal for causing the control circuit 13 to terminate the charge draw-out period t4 and to begin the ferroelectric write period t1 when |Vbb| is equal to or less than a predetermined value V4, for example, 0.91 [V]. In response to this signal, the control circuit 13 provides to the potential generating circuit 14 an output signal corresponding to the ferroelectric write period t1, and then, when the ferroelectric read period t2 begins after a predetermined period of time t1, Vbb does not increase to approximately −0.89 [V] and stops increasing, for example, at approximately −0.90 [V] with a succeeding decrease to approximately −0.95 [V], as shown in FIG. 5(*a*). Thus, the ripple will decrease from approximately 0.6 [V] (=0.95−0.89) to approximately 0.5 [V] (=0.95−0.90). The value V4 maybe determined on the condition that the complete charge draw-out period t4 elapses without fail, i.e., so that a direct transition from the ferroelectric reverse period t3 to the ferroelectric write period t1 with a skip of the charge draw-out period t4 may be prevented.

As described above, a stable output potential Vbb as well as reduced power consumption of the relevant circuits can be achieved by providing the potential detecting circuit 15 so that the control circuit 13 can control the potential generating circuit 14 in different manners in response to a signal from the potential detecting circuit 15.

Third Embodiment

Figure 7:
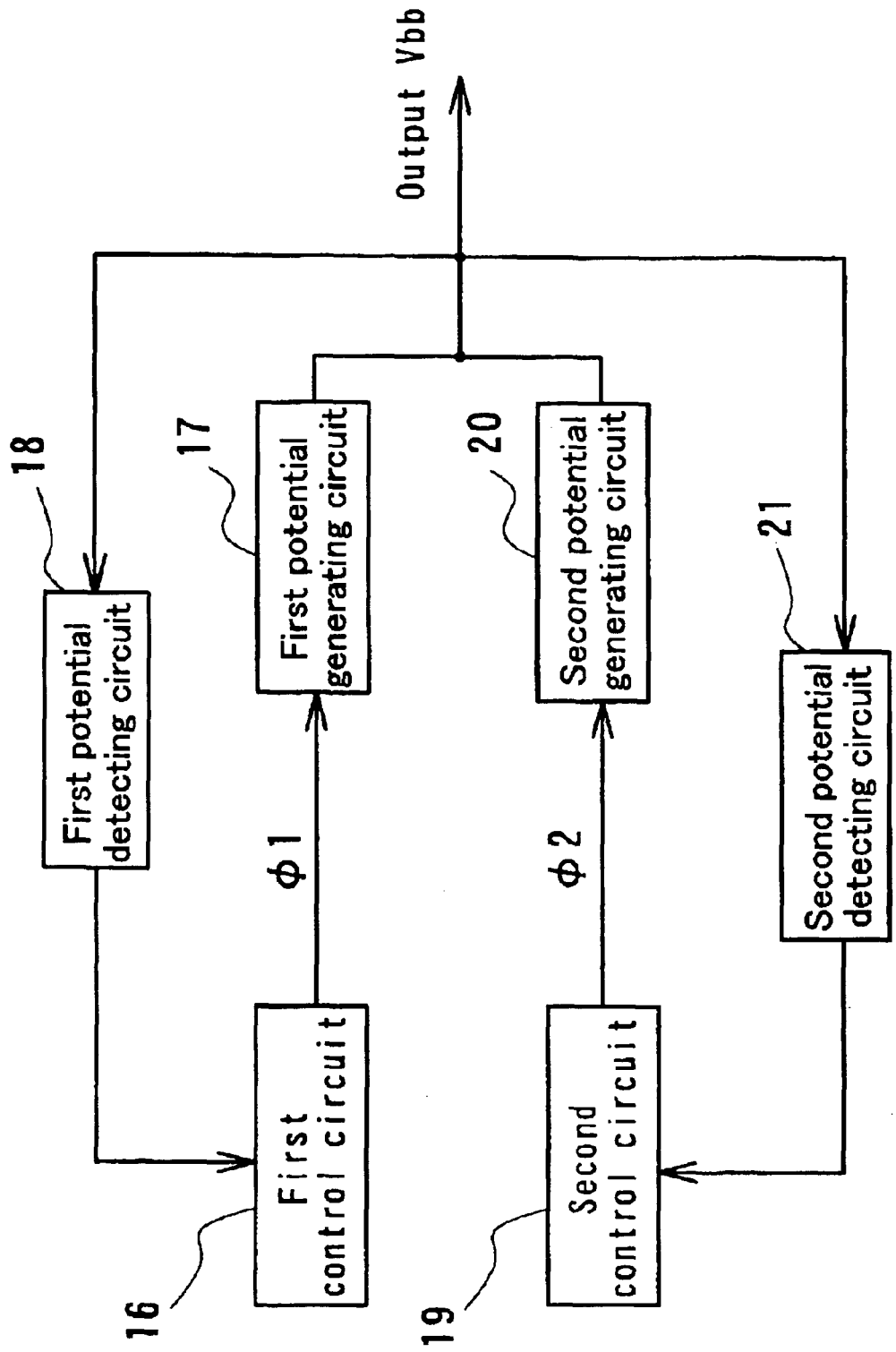
FIG. 7 is a block diagram for schematically showing the configuration of a potential generating device according to a third embodiment of the present invention.

FIG. 7 is a block diagram for schematically showing the configuration of a potential generating device according to a third embodiment of the present invention. The potential generating device according to this embodiment is configured to comprise a first control circuit 16, a first potential generating circuit 17, a first potential detecting circuit 18, a second control circuit 19, a second potential generating circuit 20, and a second potential detecting circuit 21. As shown, a combination of the first control circuit 16, the first potential generating circuit 17, and the first potential detecting circuit 18, as well as another combination of the second control circuit 19, the second potential generating circuit 20, and the second potential detecting circuit 21 have a similar circuit configuration and perform similar operations to those for the above-described second embodiment, respectively. In addition, the timing of the first control circuit 16 supplying a voltage (expressed as φ1) to the terminals of the first potential generating circuit 17 is shifted from the timing of the second control circuit 19 supplying a voltage (expressed as φ2) to the terminals of the second potential generating circuit 20 by a half cycle, when supposing that the periods t1 to t4 form a cycle as shown in FIG. 3.

For example, the first control circuit 16 supplies to the first potential generating circuit 17 a voltage corresponding to the ferroelectric read period t2 during the first half cycle, and the second control circuit 19 supplies to the second potential generating circuit 20 a voltage corresponding to the ferroelectric read period t2 during the second half cycle. During the first half cycle in this example, the second potential generating circuit is not placed in a state corresponding to the ferroelectric read period t2 and the N-channel MOS transistor 9 (see FIG. 1) is in the OFF state which causes the second potential generating circuit 20 to be disconnected from the output terminal. During the second half cycle, the first potential generating circuit 17 is not placed in a state corresponding to the ferroelectric read period t2 and the N-channel MOS transistor 9 (see FIG. 1) is in the OFF state which causes the first potential generating circuit 17 to be disconnected from the output terminal. Therefore, during the first half cycle, only the first potential generating circuit 17 is in a state corresponding to the ferroelectric read period t2 to supply a potential to the output terminal, and during the second half cycle, only the second potential generating circuit 20 is placed in a state corresponding to the ferroelectric read period t2 to supply a potential to the output terminal.

As a result of this, while the potential generating device according to the second embodiment can enter the ferroelectric read period t2 only once in a cycle to supply a potential through a connecting terminal, the potential generating device according to this embodiment can enter the ferroelectric read period t2 twice in a cycle to supply a potential through a connecting terminal and thus, the potential generating circuits 17 and 20 can supply potentials through the output terminal for a longer period as compared with the potential generating device according to the second embodiment, thereby reducing the ripple of the output voltage Vbb. In addition, since the two potential generating circuits 17 and 20 are used to supply potentials, the load current can be also increased.

As described above, the potential generating device according to this embodiment is implemented by duplexing the circuit combination of the second embodiment with the operating cycle of one combination shifted from that of the other by a half cycle, so that reduced ripple in output potential as well as increased load current can be achieved. For example, a stable output voltage with a similar time constant to that for the graph shown in FIG. 4 as well as much smaller ripple than that shown in FIG. 4 can be provided by determining the capacitance value of a load capacitor for each of the first potential generating circuit 17 and the second potential generating circuit 20 to be half the capacitance value of the load capacitor 10 in FIG. 1 and shifting the operating cycle of the first potential generating circuit 17 from that of the second potential generating circuit 20 by a half cycle.

A potential generating device according to this embodiment has been described above in terms of the circuit configuration having the two potential detecting circuits 18 and 21, however, another potential generating device according to this embodiment may have a single potential detecting circuit, which provides output signals to the two control circuits 16 and 19.

Fourth Embodiment

Figure 8:
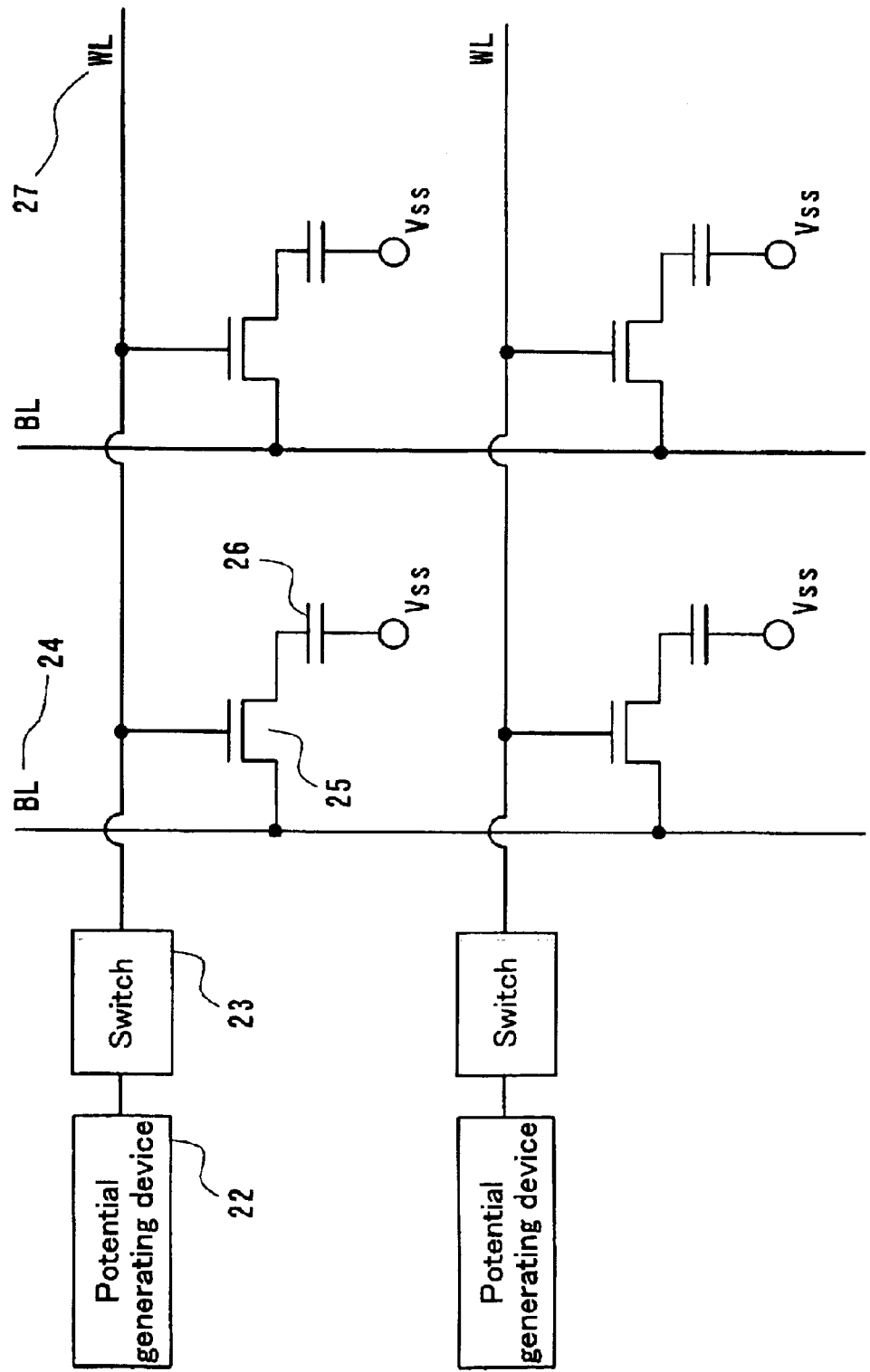
FIG. 8 is a circuit diagram for schematically showing the configuration of a semiconductor device according to a fourth embodiment of the present invention.

FIG. 8 is a block diagram for schematically showing the configuration of a semiconductor device according to a fourth embodiment of the present invention. The semiconductor device according to this embodiment is configured to comprise dynamic random access memory (DRAM) cells, potential generating devices 22 according to the second embodiment, and third switches 23. Each of the memory cells comprises a MOS transistor 25 and a capacitor 26, and is connected to a bit line (BL) 24 and a word line (WL) 27.

A DRAM must be refreshed at regular intervals to prevent loss of stored data, i.e., loss of charges in the capacitor 26 due to leak current, thereby increasing power consumption. The semiconductor device according to this embodiment can apply a negative potential to the DRAM word line 27 on standby, so that leak current from the capacitor 26 to a ground potential can be reduced in a subthreshold region of the MOS transistor 25 constituting the memory cell, thereby reducing the power consumption of the DRAM.

As shown in FIG. 8, each word line 27 has a potential generating device 22 connected thereto via a switch 23. The semiconductor device according to this embodiment places the switch 23 in the OFF state to disconnect the potential generating device 22 from the word line 27 while the memory cell is in operation, and places the switch 23 in the ON state to connect the potential generating device 22 to the word line 27 while the memory cell is on standby. This may allow the potential generating device 22 to supply a negative potential to the gate of the MOS transistor 25 in each memory cell on standby, resulting in the reduction of the leak current from the capacitor 26 to the ground potential on standby. In addition, this reduced leak current may cause a refresh cycle for the DRAM to be extended. This may also reduce the power consumption as compared with prior DRAM circuits. Furthermore, since leak current is also reduced in a sense amplification when reading a potential due to electric charges accumulated in the capacitor 26 of the memory cell, the DRAM circuit can have an improved reliability with an enhanced margin.

As described above, with the semiconductor device according to this embodiment, leak current in the memory cell on standby can be reduced with lower power consumption, by providing an output of the potential generating device 22 according to the second embodiment to the word line 27 in the memory cell on standby.

In this embodiment, the potential generating device according to the second embodiment is used for space saving, however, the potential generating device according to the third embodiment may be used. The capacitor of the memory cell may be made of a ferroelectric material, and it is needless to say that any semiconductor device which has a transfer gate for access to the memory cell, even when the memory cell comprises a field-effect transistor and a resistor, may be used to yield similar effects to those by the semiconductor according to this embodiment.

Fifth Embodiment

Figure 9:
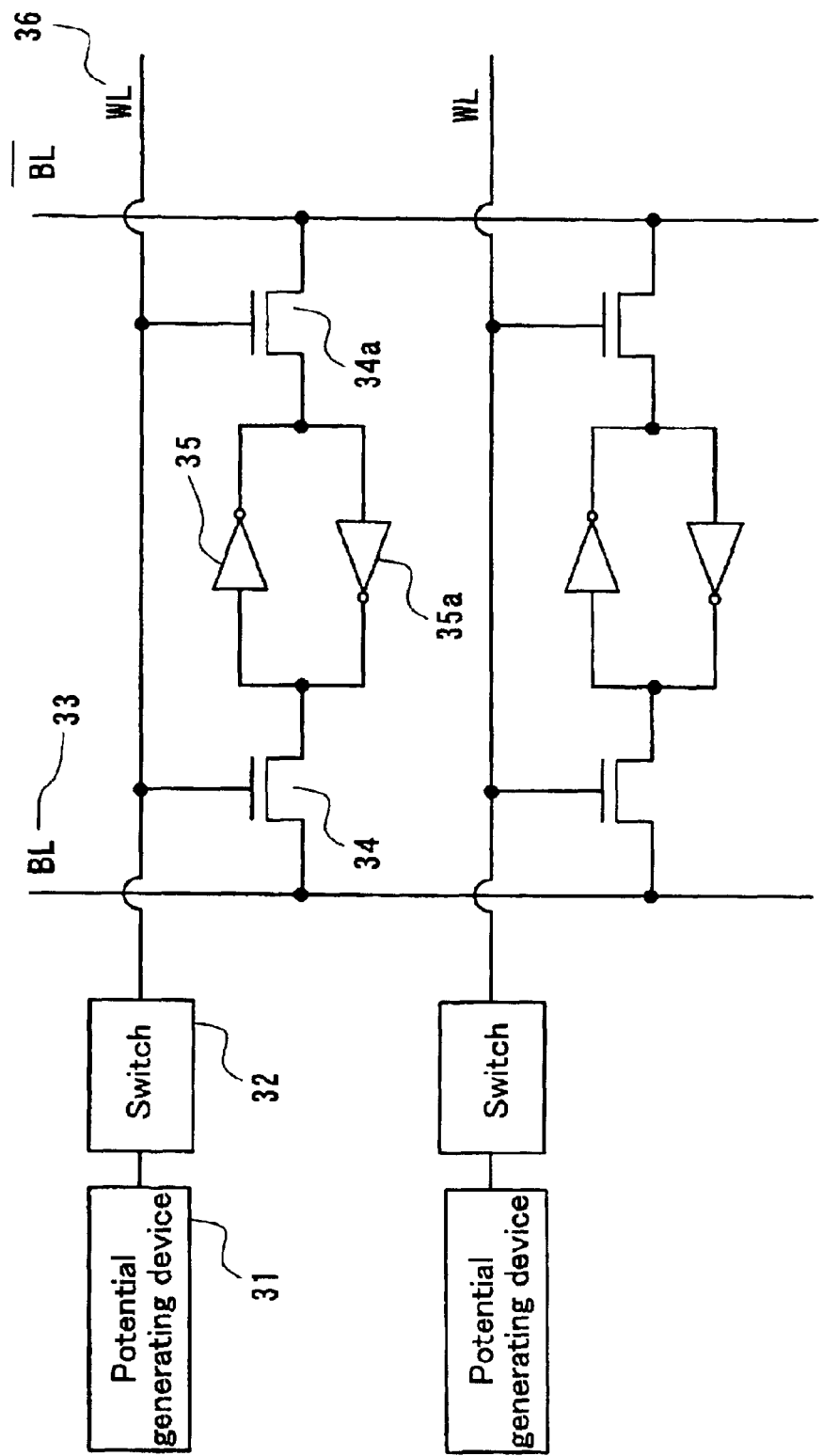
FIG. 9 is a circuit diagram for schematically showing the configuration of a semiconductor device according to a fifth embodiment of the present invention.

FIG. 9 is a block diagram for schematically showing the configuration of a semiconductor storage device according to a fifth embodiment of the present invention. The semiconductor device according to this embodiment is configured to comprise static random access memory (SRAM) cells, potential generating devices 31 according to the second embodiment, and fourth switches 32. Each of the SRAM cells comprises two transfer gates 34, 34a and two flip-flops 35, 35a and is connected to a bit line (BL) 33 and a word line (WL) 36.

The semiconductor device according to this embodiment can apply a negative potential to the word line 36 connected to the gate of the SRAM transfer gates, so that leak current from the flip-flops 35 and 35a to a ground potential can be reduced in subthreshold region of the transfer gates 34 and 34a in the memory cell, thereby reducing the power consumption as compared with prior SRAM circuits.

As shown in FIG. 9, each word line 36 has a potential generating device 31 connected thereto via a switch 32. The semiconductor device according to this embodiment places the switch 32 in the OFF state to disconnect the potential generating device 31 from the word line 36 while the memory cell is in operation, and places the switch 32 in the ON state to connect the potential generating device 31 to the word line 36 while the memory cell is on standby. This may allow the potential generating device 31 to supply a negative potential to the gate of the transfer gate in each memory cell on standby, resulting in the reduction of the leak current in the memory cell on standby, thereby reducing the power consumption.

As described above, with the semiconductor device according to this embodiment, leak current in the memory cell on standby can be reduced with lower power consumption, by providing an output of the potential generating device 31 according to the second embodiment to the word line 36 in the memory cell on standby.

In this embodiment, the potential generating device according to the second embodiment is used for space saving, however the potential generating device according to the third embodiment may be used. In addition, the SRAM memory cell is not limited to that constituted by flip-flops as shown in FIG. 9 and may be a resistance load type cell comprising resistors.

Sixth Embodiment

Figure 10:
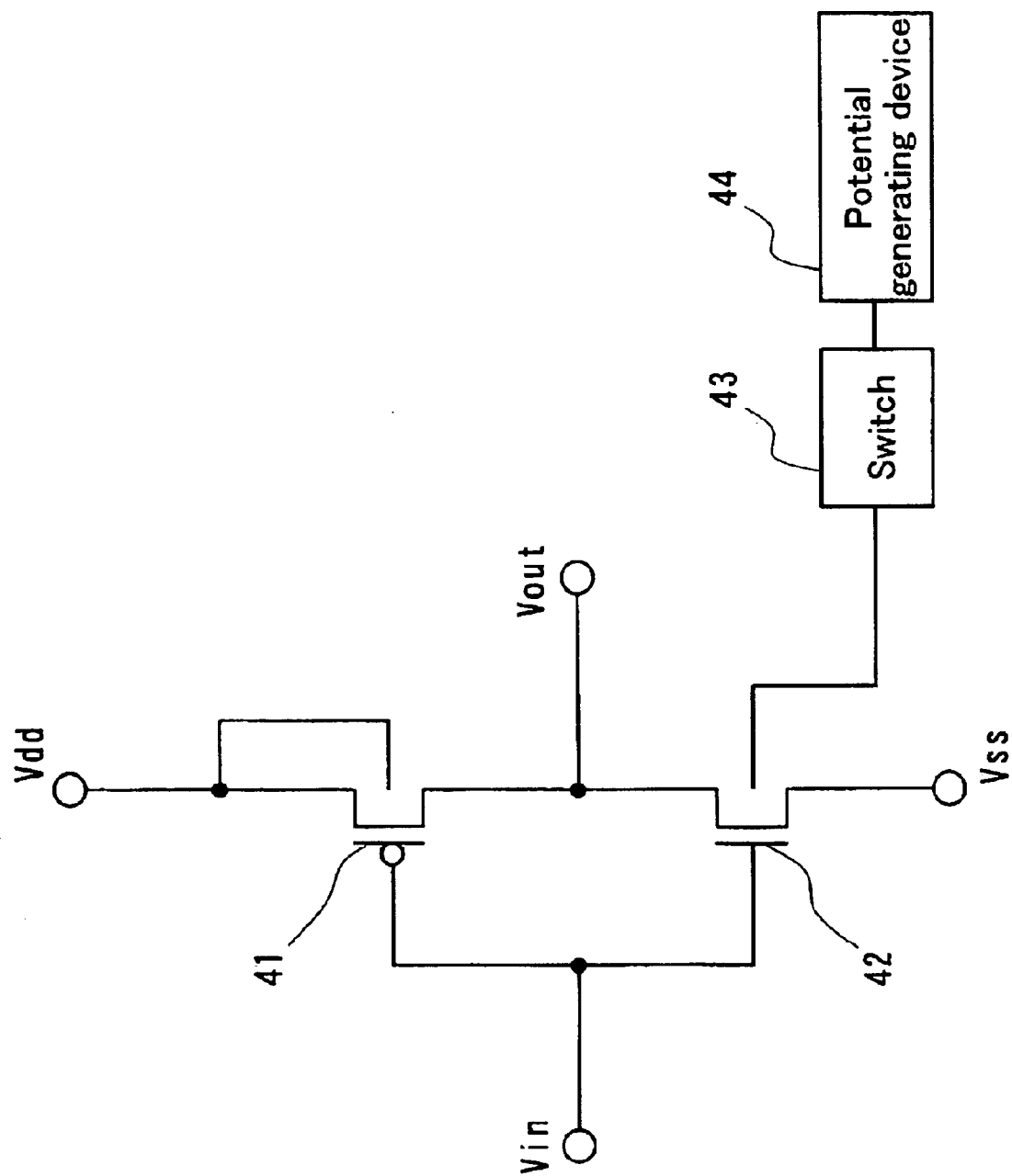
FIG. 10 is a circuit diagram for schematically showing the configuration of a semiconductor device according to a sixth embodiment of the present invention.

FIG. 10 is a block diagram for schematically showing the configuration of a semiconductor device according to a sixth embodiment of the present invention. The semiconductor device according to this embodiment is configured to comprise a P-channel MOS transistor 41 which is a P-channel field-effect transistor, a N-channel MOS transistor 42 which is a N-channel field-effect transistor, a fifth switch 43, and a potential generating device 44 according to the third embodiment. The P-channel MOS transistor 41 and the N-channel MOS transistor 42 are connected in series to constitute an inverter. The N-channel MOS transistor 42 is a variable threshold CMOS (VTCMOS) which can vary the threshold voltage of the N-channel MOS transistor by changing the substrate potential. The N-channel MOS transistor 42 has the potential generating device 44 according to the third embodiment connected to its substrate via the fifth switch 43.

Increasing the threshold voltage of the N-channel MOS transistor 42 on standby can reduce leak current from a supply potential Vdd to a ground potential Vss in a subthreshold region of the N-channel MOS transistor 42, however, for this purpose, a negative potential must be applied to the substrate of the N-channel MOS transistor 42. The semiconductor device according to this embodiment places the switch 43 in the ON state to supply a negative potential from the potential generating device 44 to the substrate of the N-channel MOS transistor 42 while the inverter circuit is on standby, and places the switch 43 in the OFF state to supply a ground potential to the substrate of the N-channel MOS transistor 42 while the inverter circuit is in operation. This may increase the threshold voltage of the N-channel MOS transistor 42 and reduce the leak current while the inverter circuit is on standby, and increase the driving current while the inverter circuit is in operation.

As described above, the leak current on standby can be reduced as compared with prior VTCMOSs, by providing an output of the potential generating circuit 44 according to the third embodiment to the substrate of the N-channel MOS transistor 42 on standby. In addition, since the threshold of the N-channel MOS transistor in operation is reduced as compared with that on standby, the driving current can be increased.

In this embodiment, the potential generating device according to the third embodiment is used, however the potential generating device according to the second embodiment may be used. In that case, of course, similar effects may be yielded. In addition, this embodiment has been described in terms of the inverter circuit, however it is not limited to the inverter circuit but any circuit comprising VTCMOSs may be embodied.

Seventh Embodiment

Figure 11:
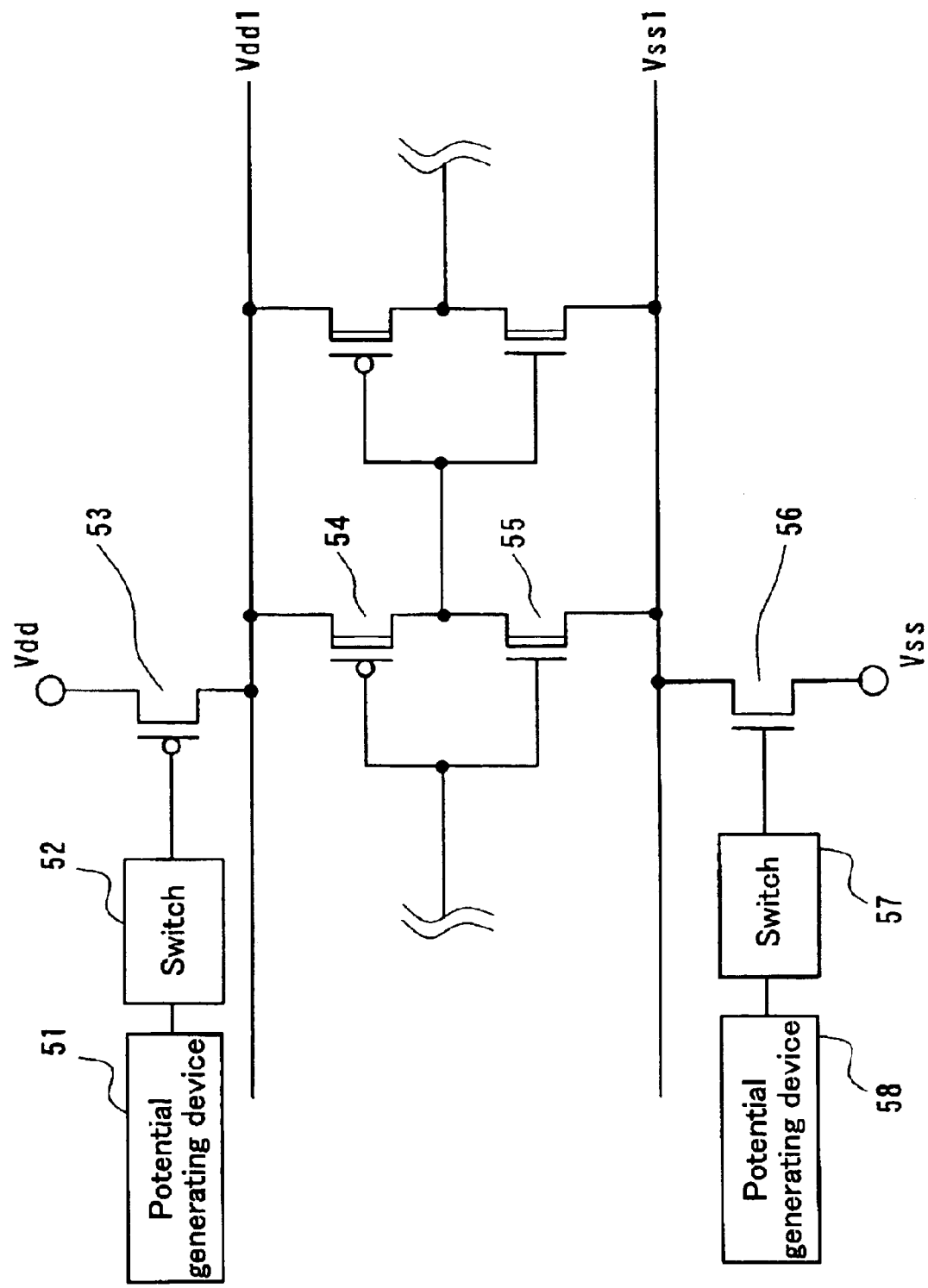
FIG. 11 is a circuit diagram for schematically showing the configuration of a semiconductor device according to a seventh embodiment of the present invention.
Figure 12:
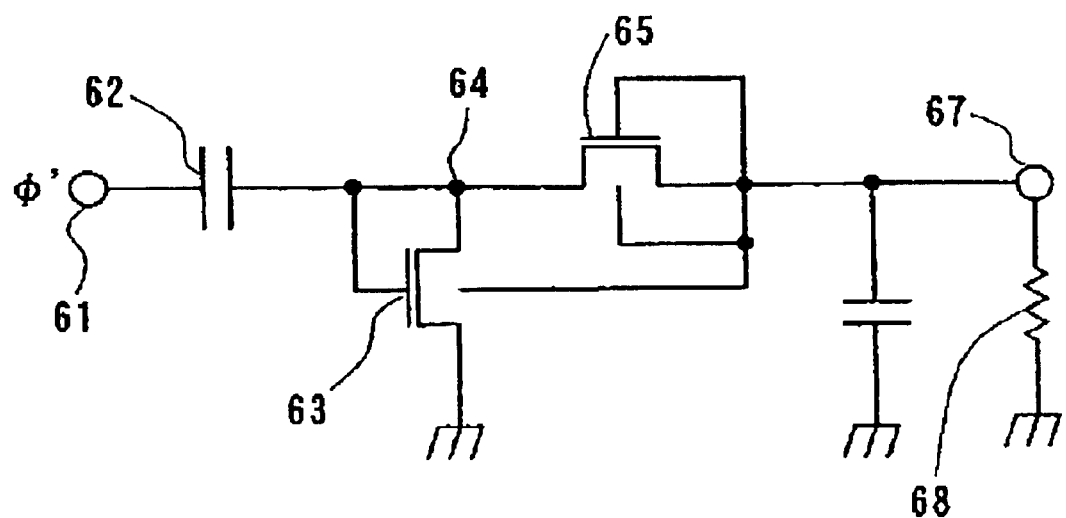
FIG. 12 is a circuit diagram for showing a prior substrate bias generating circuit.
Figure 13:
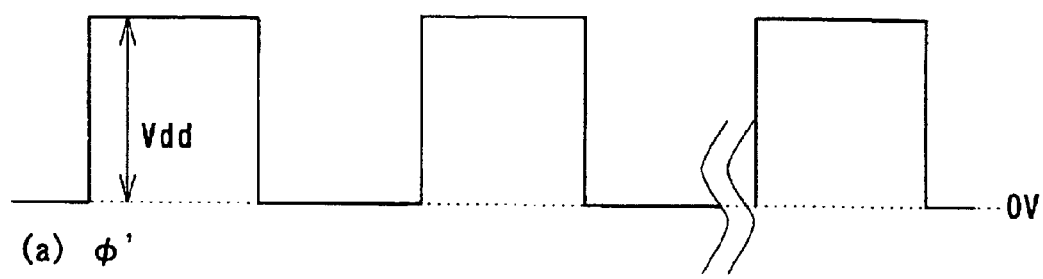
FIG. 13 is an explanatory drawing for the operation of the prior substrate bias generating circuit.
Figure 13:
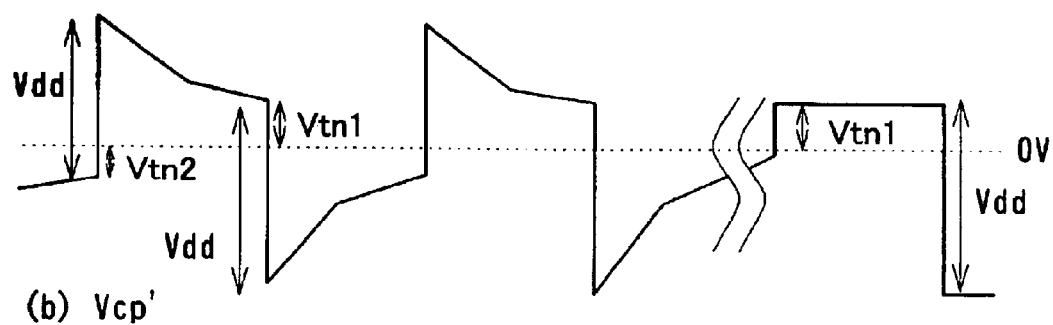
Figure 13:
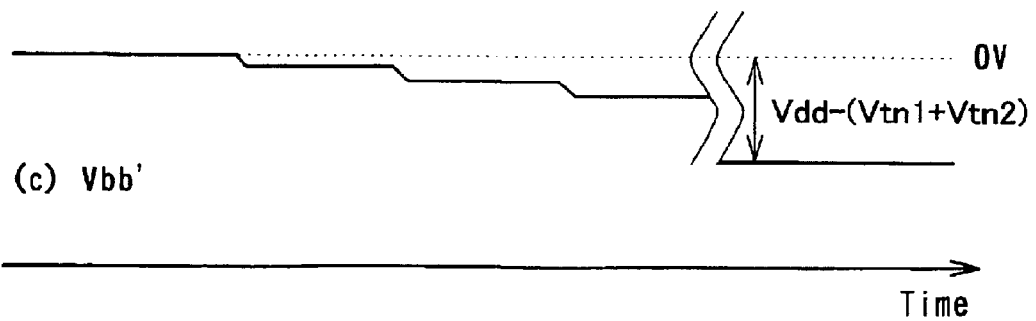

FIG. 11 is a block diagram for schematically showing the configuration of a semiconductor device according to a seventh embodiment of the present invention. The semiconductor device according to this embodiment is configured to comprise a first potential generating device 51, a sixth switch 52, a high-threshold P-channel MOS transistor 53, a high-threshold N-channel MOS transistor 56, a seventh switch 57, a second potential generating device 58, and a low-threshold P-channel MOS transistor 54 and a low-threshold N-channel MOS transistor 55 both of which constitute a logic circuit. The potential generating devices 51 and 58 are both potential generating devices according to the third embodiment as shown in FIG. 7. Gate control lines used to supply a positive potential to the respective gates of the high-threshold P-channel MOS transistor 53 and the high-threshold N-channel MOS transistor 56 are omitted in the figure.

In the semiconductor device according to this embodiment, the low-threshold MOS transistors 54 and 55 which are MOS transistors with a low threshold voltage are used in the logic circuit in order to increase the driving current, and the high-threshold MOS transistors 53 and 56 which are MOS transistors with a high threshold voltage are used between the logic circuit and the supply potential Vdd and between the logic circuit and the ground potential Vss, respectively, to avoid leak current troubles. A circuit which uses MOS transistors with different threshold voltages as described above is referred to as a multi threshold CMOS (MTCMOS).

While the logic circuit is in operation, the semiconductor device according to this embodiment places the seventh switch 57 in the OFF state to supply a positive potential from the gate control line (not shown) to the gate of the high-threshold N-channel MOS transistor 56 and places the sixth switch 52 in the ON state to connect the first potential generating device 51 to the gate of the high-threshold P-channel MOS transistor 53 and to supply a negative potential thereto. This may increase the driving current while the circuit is in operation. Namely, as compared with prior MTCMOSs, a larger driving current can be provided while the circuit is in operation.

While the logic circuit is on standby, the semiconductor device according to this embodiment places the sixth switch 52 in the OFF state to supply a positive potential from the gate control line (not shown) to the gate of the high-threshold P-channel MOS transistor 53 and places the seventh switch 57 in the ON state to connect the second potential generating device 58 to the gate of the high-threshold N-channel MOS transistor 56 and to supply a negative potential thereto. This may reduce the leak current from the supply potential Vdd to the ground potential Vss in a subthreshold region of the high-threshold N-channel MOS transistor 56. Namely, as compared with prior MTCMOSs, a smaller leak current can be provided while the circuit is on standby.

As described above, supplying a negative potential to the gate of the high-threshold MOS transistor can increase the driving current while the circuit is in operation and reduce the leak current while the circuit is on standby.

The logic circuit is not limited to that composed of the low-threshold MOS transistors 54 and 55 as shown in FIG. 11 and may be any circuit configured to supply a predetermined potential (such as the supply potential or the ground potential) to the logic circuit via a MOS transistor with a higher threshold voltage than that of MOS transistors constituting the logic circuit. Namely, the circuit according to this embodiment may be configured to supply a negative potential from the potential generating device to the high-threshold P-channel MOS transistor for supplying a predetermined potential to the logic circuit while the logic circuit is in operation and to supply a negative potential from the potential generating device to the high-threshold N-channel MOS transistor for supplying a predetermined potential to the logic circuit while the logic circuit is on standby.

INDUSTRIAL APPLICABILITY

The present invention does not cause the voltage drop of output potential due to the threshold voltage of a N-channel MOS transistor, which a prior substrate bias generating circuit using a charging pump circuit has suffered from, and thus, can implement a potential generating circuit, a potential generating device, and a driving method thereof, all of which can supply potentials with a higher power efficiency. Application of the present invention can provide a semiconductor device with reduced leak current and lower power consumption or a semiconductor device with increased driving current.

What is claimed is:

1. A potential generating circuit comprising:
a first capacitor;
a second capacitor which is a ferroelectric capacitor connected in series to the first capacitor;
an output terminal;
a third capacitor for grounding the output terminal;
a first switch for connecting a connecting node between the first capacitor and the second capacitor to the output terminal; and
a second switch for connecting the connecting node to the ground;
wherein during a first period, with the first switch and the second switch placed in the OFF state, a first terminal of the first capacitor opposed to the connecting node is provided with a positive potential and a second terminal of the second capacitor opposed to the connecting node is grounded;
wherein during a second period following the first period, the first terminal is grounded and the first switch is placed in the ON state;
wherein during a third period following the second period, the first switch is placed in the OFF state, the second switch is placed in the ON state, and the second terminal is provided with a positive potential;
wherein during a fourth period following the third period, the second terminal is grounded; and
wherein the first through fourth periods are repeated.

2. A potential generating circuit according to claim 1, wherein each of the first switch and the second switch is composed of a MOS transistor; and
wherein the substrate of the MOS transistor constituting each of the first switch and the second switch is connected to the output terminal.

3. A method of driving a potential generating circuit according to claim 1, comprising:
a first period during which the first terminal is caused to have a positive potential, the second terminal is grounded, and the first switch and the second switch are placed in the OFF state;
a second period following the first period, during which the first terminal is grounded and the first switch is placed in the ON state;
a third period following the second period, during which the first switch is placed in the OFF state, the second switch is placed in the ON state, and the second terminal is caused to have a positive potential; and
a fourth period following the third period, during which the second terminal is grounded;
wherein the first through fourth periods are repeated.

4. A potential generating device comprising:
a potential generating circuit according to claim 1;
a control circuit for supplying to the potential generating circuit a driving signal for causing the first terminal to have a positive potential and grounding the second terminal, then grounding the first terminal and placing the first switch in the ON state, then placing the first switch and the second switch in the OFF and ON states, respectively, and causing the second terminal to have a positive potential, and then grounding the second terminal; and a potential detecting circuit for detecting an output potential at the output terminal;

wherein the potential detecting circuit provides the control circuit with a control signal according to the detected output potential; and wherein the control circuit provides or stops providing the driving signal in response to the control signal.

5. A potential generating device according to claim 4:

wherein the potential detecting circuit provides the control circuit with an enabling signal so that the control circuit can provide the driving signal when the absolute value of the detected output potential is equal to or less than a first value;

wherein the potential detecting circuit continues to provide the enabling signal until the absolute value is equal to or more than a second value;

wherein the potential detecting circuit provides the control circuit with a stop signal so that the control circuit can stop providing the driving signal when the absolute value is equal to or more than the second value; and wherein the potential detecting circuit continues to provide the stop signal until the absolute value is equal to or less than the first value.

6. A method of driving a potential generating device which comprises a potential generating circuit according to claim 1, a control circuit for supplying a driving signal to the potential generating circuit, and a potential detecting circuit for supplying a control signal to the control circuit, comprising:

a detecting step wherein the potential detecting circuit detects an output potential at the output terminal in the potential generating circuit;

an enabling step wherein the potential detecting circuit provides the control circuit with an enabling signal so that the control circuit can provide the driving signal when the absolute value of the detected output potential is equal to or less than a first value, and the potential detecting circuit continues to provide the enabling signal until the absolute value is equal to or more than a second value;

a disabling step wherein the potential detecting circuit provides the control circuit with a stop signal so that the control circuit can stop providing the driving signal when the absolute value is equal to or more than the second value, and the potential detecting circuit continues to provide the stop signal until the absolute value is equal to or less than the first value;

a driving step wherein the control circuit provides the potential generating circuit with the driving signal upon receipt of the enabling signal; and a stopping step wherein the control circuit stops providing the potential generating circuit with the driving signal upon receipt of the stop signal.

7. A potential generating device comprising:

a potential generating circuit according to claim 1;

a control circuit for supplying to the potential generating circuit a driving signal for causing the first terminal to have a positive potential and grounding the second terminal, then grounding the first terminal and placing the first switch in the ON state, then placing the first switch and the second switch in the OFF and ON states, respectively, and causing the second terminal to have a positive potential, and then grounding the second terminal; and a potential detecting circuit for detecting an output potential at the output terminal;

wherein the potential detecting circuit provides a predetermined signal when the absolute value of the detected output potential at the output terminal is equal to or less than a predetermined value; and wherein the control circuit provides a driving signal for supplying a positive potential to the first terminal, supplying a ground potential to the second terminal, and supplying such a potential that the first switch and the second switch are placed in the OFF state, when the control circuit receives the predetermined signal while providing the driving signal for supplying a ground potential to the first terminal and the second terminal and supplying such potentials that the first switch is placed in the OFF state and the second switch is placed in the ON state.

8. A potential generating device comprising:

a first potential generating circuit according to claim 1;

a second potential generating circuit configured to comprise a fourth capacitor, a fifth capacitor which is a ferroelectric capacitor connected in series to the fourth capacitor, a sixth capacitor for grounding the output terminal, a third switch for connecting a second connecting node between the fourth capacitor and the fifth capacitor to the output terminal, and a fourth switch for connecting the second connecting node to the ground;

a first control circuit for supplying to the first potential generating circuit a first driving signal for causing the first terminal to have a positive potential and grounding the second terminal, then grounding the first terminal and placing the first switch in the ON state, then placing the first switch and the second switch in the OFF and ON states, respectively, and causing the second terminal to have a positive potential, and then grounding the second terminal;

a second control circuit for supplying to the second potential generating circuit a second driving signal for causing the third terminal of the fourth capacitor opposed to the second connecting node to have a positive potential and grounding the fourth terminal of the fifth capacitor opposed to the second connecting node, then grounding the third terminal and placing the third switch in the ON state, then placing the third switch and the fourth switch in the OFF and ON states, respectively, and causing the fourth terminal to have a positive potential, and then grounding the fourth terminal; and a potential detecting circuit for detecting an output potential at the output terminal;

wherein an output timing of the first driving signal is shifted from an output timing of the second driving signal by a half cycle;

wherein the potential detecting circuit provides the first control circuit and the second control circuit with a control signal according to the detected output potential;

wherein the first control circuit provides or stops providing the first driving signal in response to the control signal; and wherein the second control circuit provides or stops providing the second driving signal in response to the control signal.

9. A potential generating device according to claim 8:
wherein the potential detecting circuit provides the first control circuit and the second control circuit with an enabling signal so that the first control circuit and the second control circuit can provide the first driving signal and the second driving signal, respectively, when the absolute value of the detected output potential is equal to or less than a first value;

wherein the potential detecting circuit continues to provide the enabling signal until the absolute value is equal to or more than a second value;

wherein the potential detecting circuit provides the first control circuit and the second control circuit with a stop signal so that the first control circuit and the second control circuit can stop providing the first driving signal and the second driving signal, respectively, when the absolute value is equal to or more than the second value; and wherein the potential detecting circuit continues to provide the stop signal until the absolute value is equal to or less than the first value.

10. A method of driving a potential generating device according to claim 8, comprising:

a detecting step wherein the potential detecting circuit detects an output potential at the output terminal;

an enabling step wherein the potential detecting circuit provides the first control circuit and the second control circuit with an enabling signal so that the first control circuit and the second control circuit can provide the first driving signal and the second driving signal, respectively, when the absolute value of the detected output potential is equal to or less than a first value, and the potential detecting circuit continues to provide the enabling signal until the absolute value is equal to or more than a second value;

a disabling step wherein the potential detecting circuit provides the first control circuit and the second control circuit with a stop signal so that the first control circuit and the second control circuit can stop providing the first driving signal and the second driving signal, respectively, when the absolute value is equal to or more than the second value, and the potential detecting circuit continues to provide the stop signal until the absolute value is equal to or less than the first value;

a first driving step wherein the first control circuit provides the first potential generating circuit with the first driving signal upon receipt of the enabling signal;

a first stopping step wherein the first control circuit stops providing the first potential generating circuit with the first driving signal upon receipt of the stop signal;

a second driving step wherein the second control circuit provides the second potential generating circuit with the second driving signal, at a timing shifted by a half cycle from the output timing of the first driving signal, upon receipt of the enabling signal; and a second stopping step wherein the second control circuit stops providing the second potential generating circuit with the second driving signal upon receipt of the stop signal.

11. A semiconductor device comprising:
a memory cell;
a fifth switch; and
a potential generating device according to claim 4 which is connected to a word line of the memory cell via the fifth switch;
wherein the fifth switch is placed in the ON state while the memory cell is on standby.

12. A semiconductor device according to claim 11, wherein the memory cell is composed of a field-effect transistor and a capacitor.

13. A semiconductor device according to claim 11, wherein the memory cell is composed of field-effect transistors and flip-flops.

14. A semiconductor device according to claim 11, wherein the memory cell is a resistance load type cell composed of field-effect transistors and resistors.

15. A semiconductor device comprising:
a potential generating device according to claim 4;
a N-channel field-effect transistor; and
a sixth switch for connecting the output terminal of the potential generating device to the substrate of the N-channel field-effect transistor;
wherein the sixth switch is placed in the ON state while the N-channel field-effect transistor is on standby.

16. A semiconductor device comprising:
a potential generating device according to claim 4;
a logic circuit composed of field-effect transistors;
a high-threshold P-channel field-effect transistor connecting the logic circuit to a predetermined potential and having a threshold voltage larger than those of the field-effect transistors; and
a seventh switch for connecting the gate of the high-threshold P-channel field-effect transistor to the potential generating device;
wherein the seventh switch is placed in the ON state while the logic circuit is in operation and in the OFF state while the logic circuit is on standby.

17. A semiconductor device comprising:
a potential generating device according to claim 4;
a logic circuit composed of field-effect transistors;
a high-threshold N-channel field-effect transistor connecting the logic circuit to a predetermined potential and having a threshold voltage larger than those of the field-effect transistors; and
an eighth switch for connecting the gate of the high-threshold N-channel field-effect transistor to the potential generating device;
wherein the eighth switch is placed in the ON state while the logic circuit is on standby and in the OFF state while the logic circuit is in operation.

18. A method of driving a semiconductor device according to claim 16, comprising:
an operating step wherein while the logic circuit is in operation, the seventh switch is placed in the ON state and a negative potential is supplied by the potential generating device to the gate of the high-threshold P-channel field-effect transistor; and
a standby step wherein while the logic circuit is on standby, the seventh switch is placed in the OFF state and a positive potential is supplied to the gate of the high-threshold P-channel field-effect transistor.

19. A method of driving a semiconductor device according to claim 17, comprising:
a standby step wherein while the logic circuit is on standby, the eighth switch is placed in the ON state and a negative potential is supplied by the potential generating device to the gate of the high-threshold N-channel field-effect transistor; and
an operating step wherein while the logic circuit is in operation, the eighth switch is placed in the OFF state and a positive potential is supplied to the gate of the high-threshold N-channel field-effect transistor.

* * * * *

UNITED STATES PATENT AND TRADEMARK OFFICE
CERTIFICATE OF CORRECTION

PATENT NO.    : 6,809,953 B2
DATED         : October 26, 2004
INVENTOR(S)   : Kenji Toyoda et al.

It is certified that error appears in the above-identified patent and that said Letters Patent is hereby corrected as shown below:

Title page,
Item [75], Inventors,
For the 2nd inventor, change "Takatsuki" to -- Osaka --,
For the 3rd inventor, change "Hirakata" to -- Osaka --,
For the 4th inventor, change "Yawata" to -- Kyoto --,
For the 6th inventor, change "Yawata" to -- Kyoto --.

Signed and Sealed this

Sixteenth Day of August, 2005

JON W. DUDAS
*Director of the United States Patent and Trademark Office*